(12) United States Patent
Yoshizawa et al.

(10) Patent No.: US 12,339,730 B2
(45) Date of Patent: Jun. 24, 2025

(54) HEAD MOUNTED DISPLAY APPARATUS

(71) Applicant: Maxell, Ltd., Kyoto (JP)

(72) Inventors: Kazuhiko Yoshizawa, Kyoto (JP);
Yasunobu Hashimoto, Kyoto (JP);
Hitoshi Akiyama, Kyoto (JP); Nobuo Masuoka, Kyoto (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 18/718,179

(22) PCT Filed: Dec. 22, 2021

(86) PCT No.: PCT/JP2021/047720
§ 371 (c)(1),
(2) Date: Jun. 10, 2024

(87) PCT Pub. No.: WO2023/119528
PCT Pub. Date: Jun. 29, 2023

(65) Prior Publication Data
US 2025/0045134 A1 Feb. 6, 2025

(51) Int. Cl.
*G02B 27/01* (2006.01)
*G06F 3/01* (2006.01)
(Continued)

(52) U.S. Cl.
CPC .............. *G06F 11/00* (2013.01); *G06F 3/013* (2013.01); *G06V 20/20* (2022.01)

(58) Field of Classification Search
CPC ......... G06F 11/00; G06F 3/013; G06V 20/20; G02B 27/02; G02B 2027/0138;
(Continued)

(56) References Cited

U.S. PATENT DOCUMENTS

| 2008/0244671 A1* | 10/2008 | Moon ................ H04N 21/4722 348/E5.002 |
| 2016/0021360 A1* | 1/2016 | Nishizawa ........... H04N 13/344 348/53 |
| 2016/0353155 A1* | 12/2016 | Yoshizawa ........... H04N 21/488 |

FOREIGN PATENT DOCUMENTS

| JP | 11-196345 A | 7/1999 |
| JP | 2012-163666 A | 8/2012 |

(Continued)

OTHER PUBLICATIONS

International Search Report of PCT/JP2021/047720 dated Mar. 22, 2022.

*Primary Examiner* — Pegeman Karimi
(74) *Attorney, Agent, or Firm* — Mattingly & Malur, PC

(57) ABSTRACT

A head mounted display includes a transmissive display, an image capturing part acquires field of view range image, and an additional information presence/absence analysis part that analyzes the acquired field of view range image, confirms whether there is an information terminal included in the field of view range of user and whether a display image of an information terminal included in the field of view range of the user is one in which additional information is superimposed on the main image. An additional information acquisition part requests the information terminal to send additional information, and receives the additional information. A display controller detects an information terminal visual recognition area that is an area where the information terminal is viewed in the transmissive display, and displays the received additional information in a position that does not overlap with the information terminal visual recognition area of the transmissive display.

15 Claims, 29 Drawing Sheets

(51) Int. Cl.
  *G06F 11/00* (2006.01)
  *G06V 20/20* (2022.01)
(58) Field of Classification Search
  CPC ...... G02B 2027/014; G02B 2027/0187; G02B 27/017; G09G 5/026; G09G 5/14; G09G 2320/068; G09G 2340/0464; G09G 2340/12; G09G 2340/14; G09G 3/002; H04N 5/66
  See application file for complete search history.

(56) References Cited

FOREIGN PATENT DOCUMENTS

| | | | |
|---|---|---|---|
| JP | 2012205191 A | * | 10/2012 |
| JP | 2016-24208 A | | 2/2016 |
| WO | 2021/181604 A1 | | 9/2021 |
| WO | 2021/245773 A1 | | 12/2021 |

* cited by examiner

FIG.8
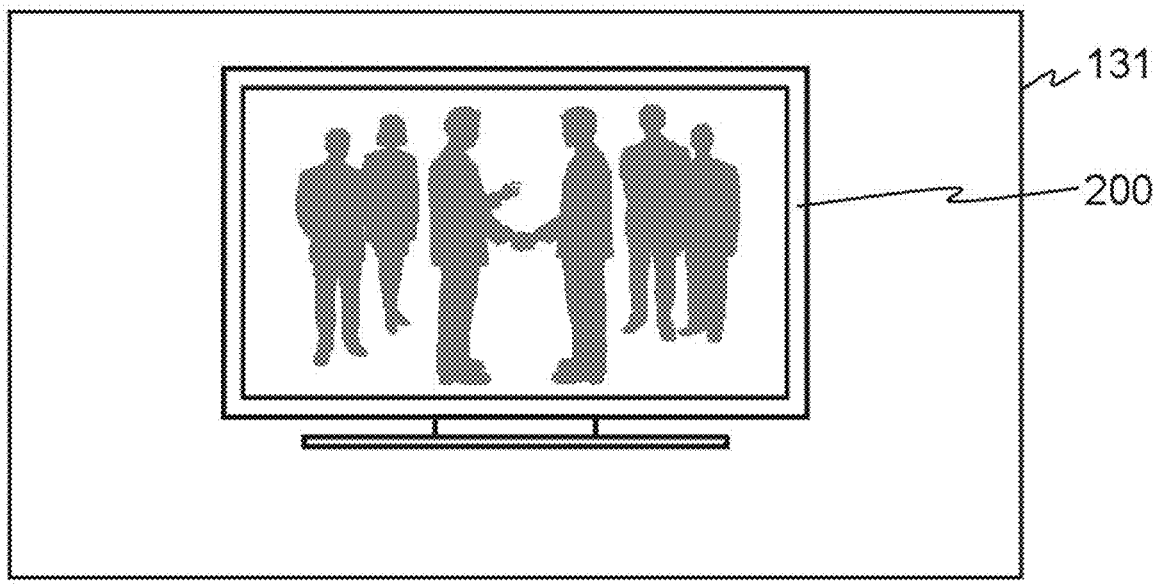
(USER'S FIELD OF VIEW THROUGH A TRANSMISSIVE DISPLAY)
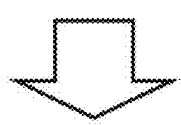
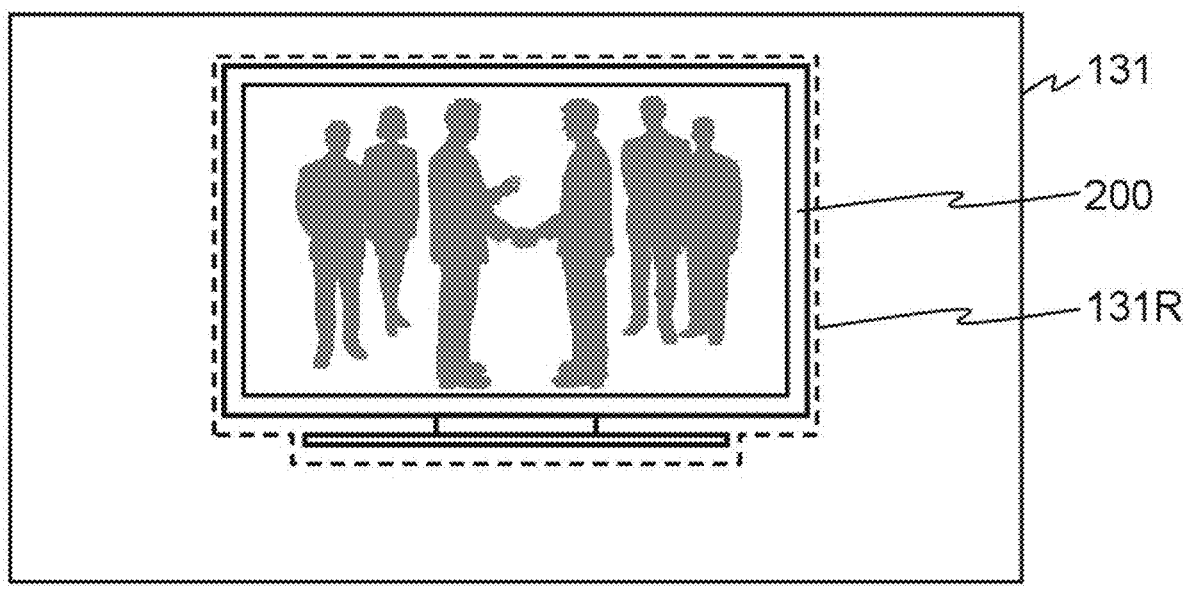
(INFORMATION TERMINAL VISUAL RECOGNITION AREA DETECTED ON THE TRANSMISSIVE DISPLAY)

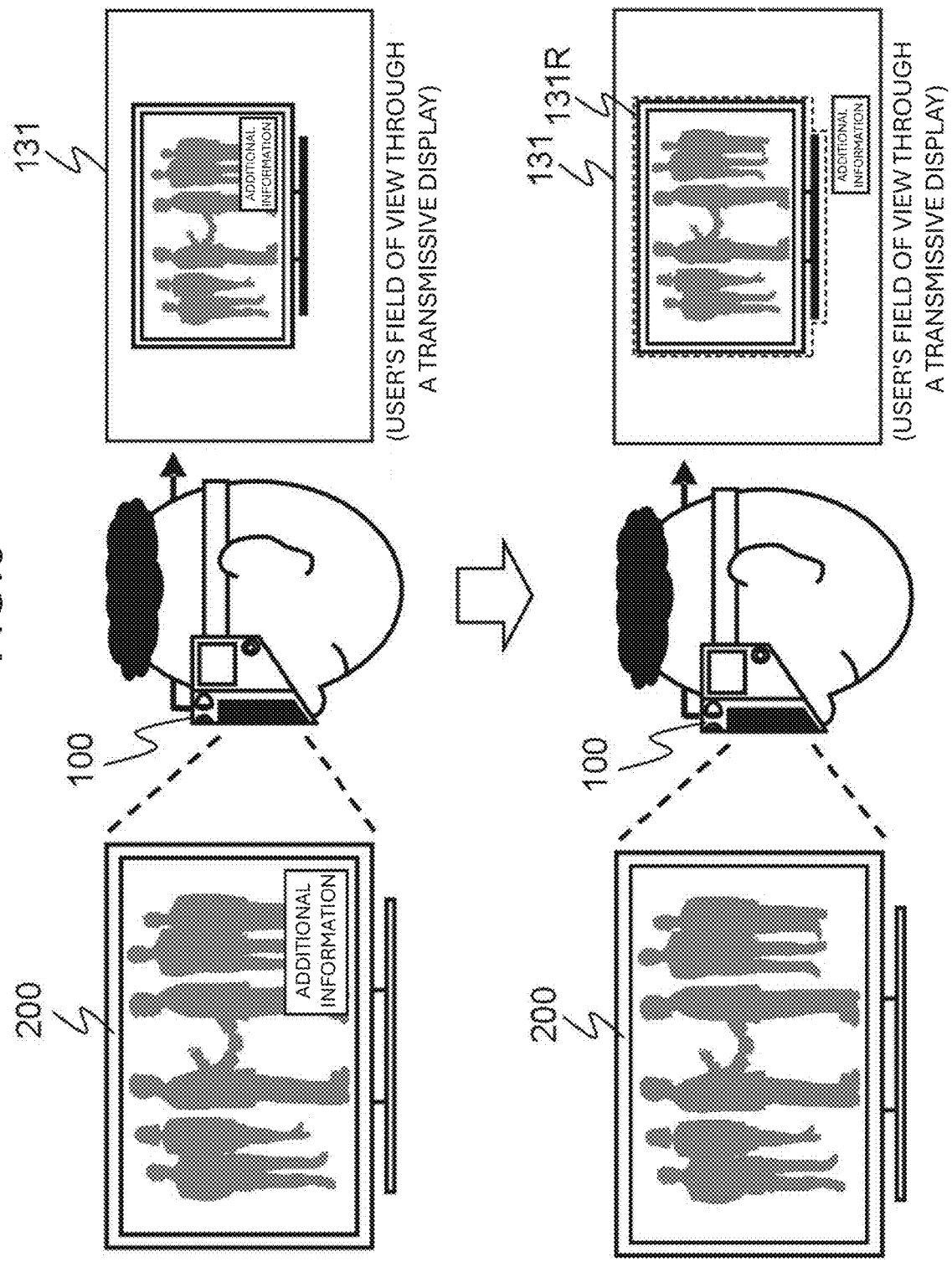

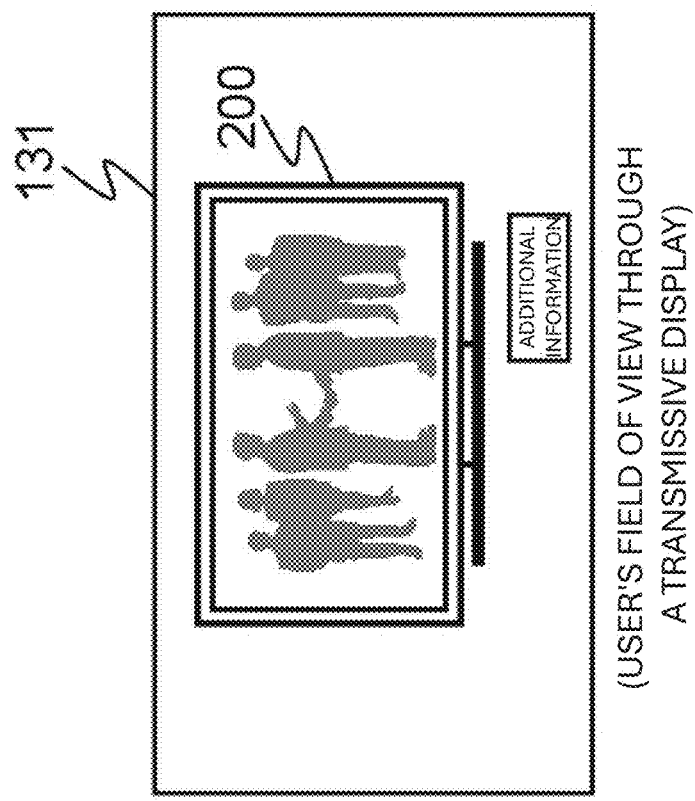
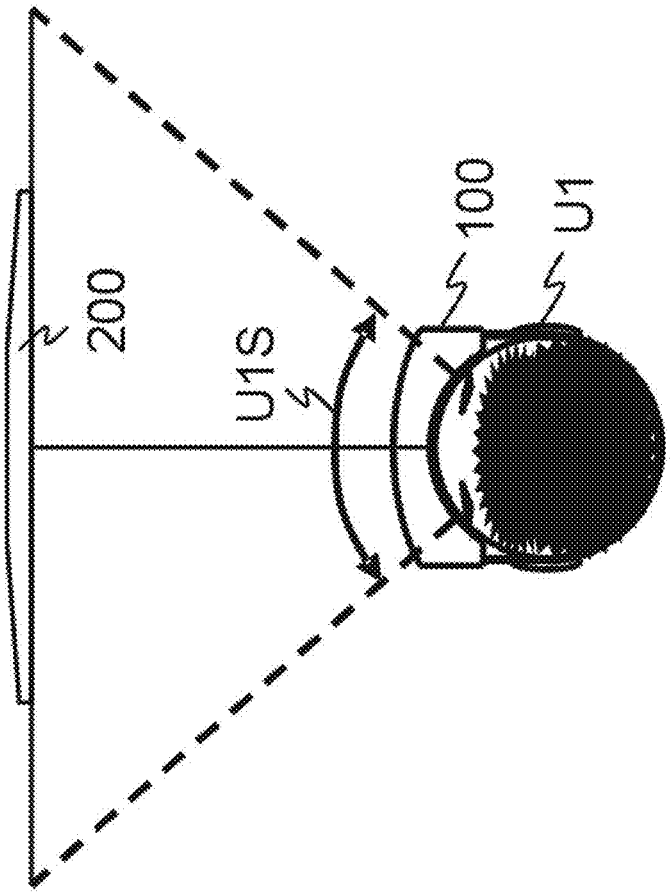
FIG.10A

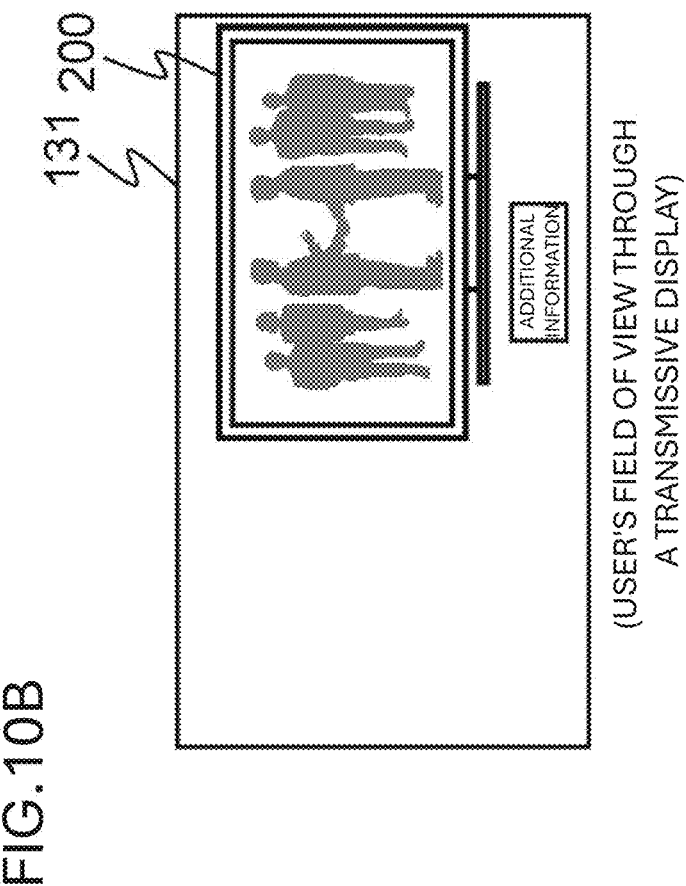
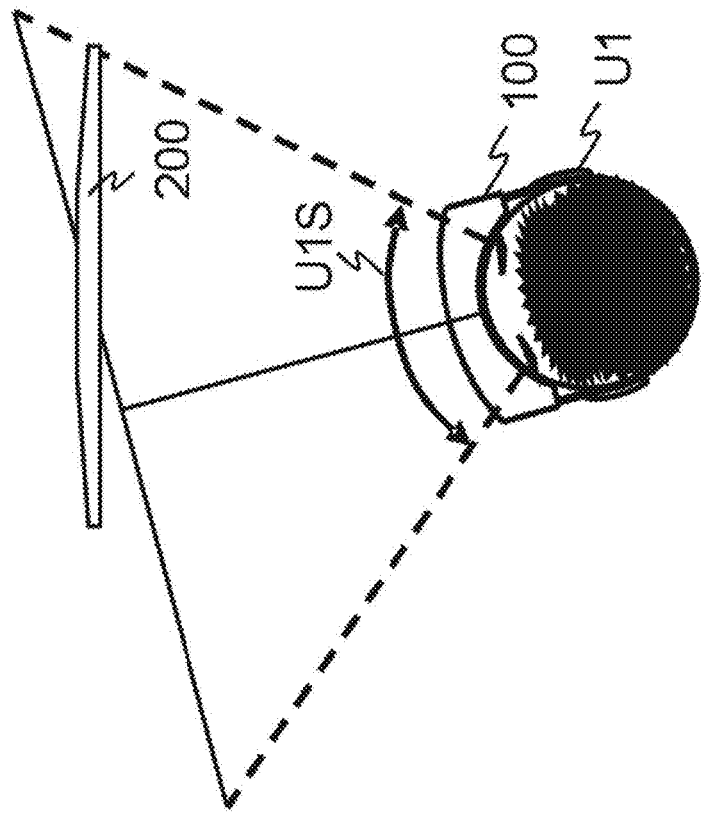
FIG.10B

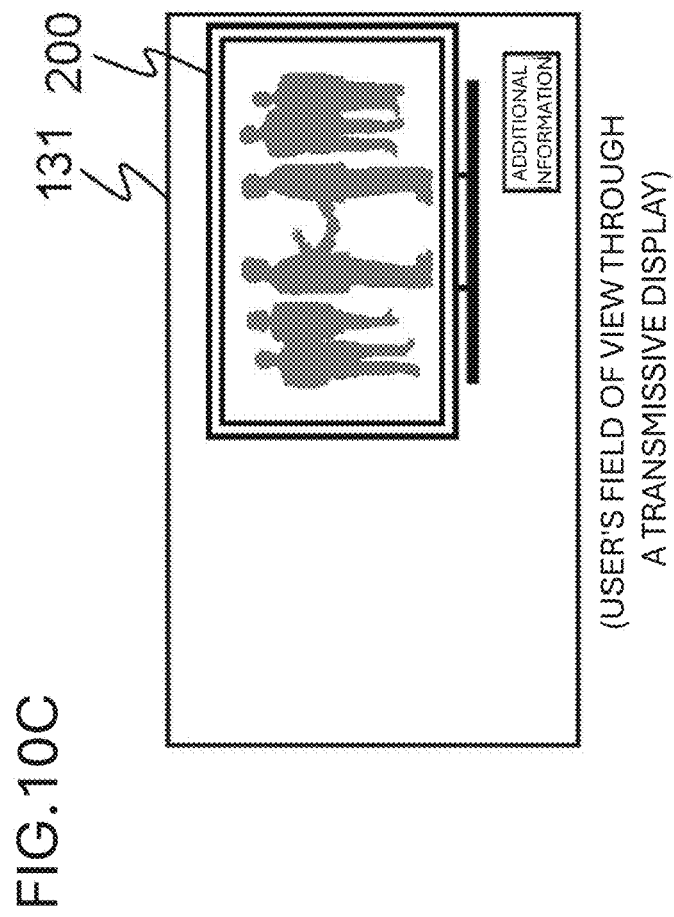
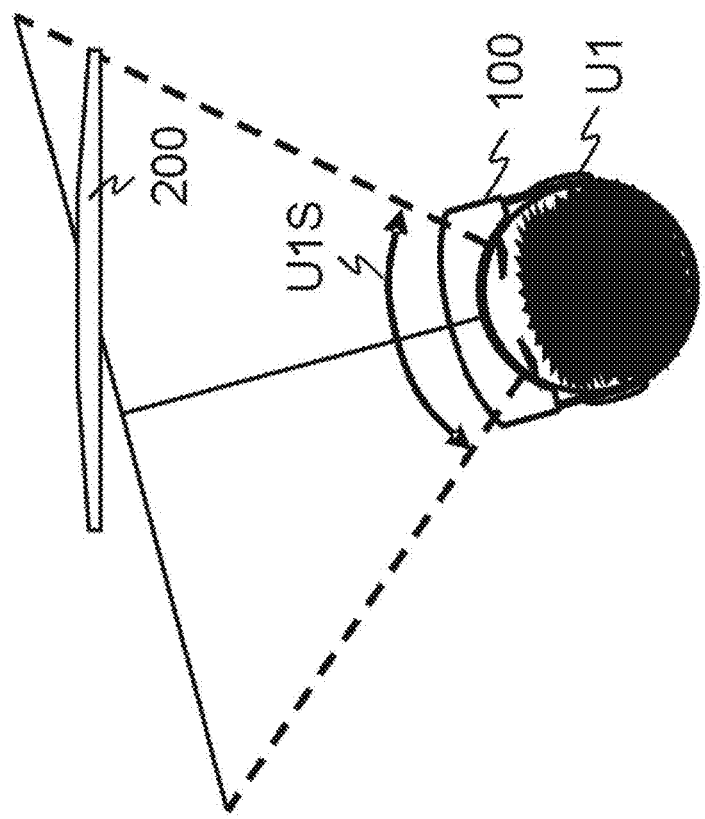
FIG.10C

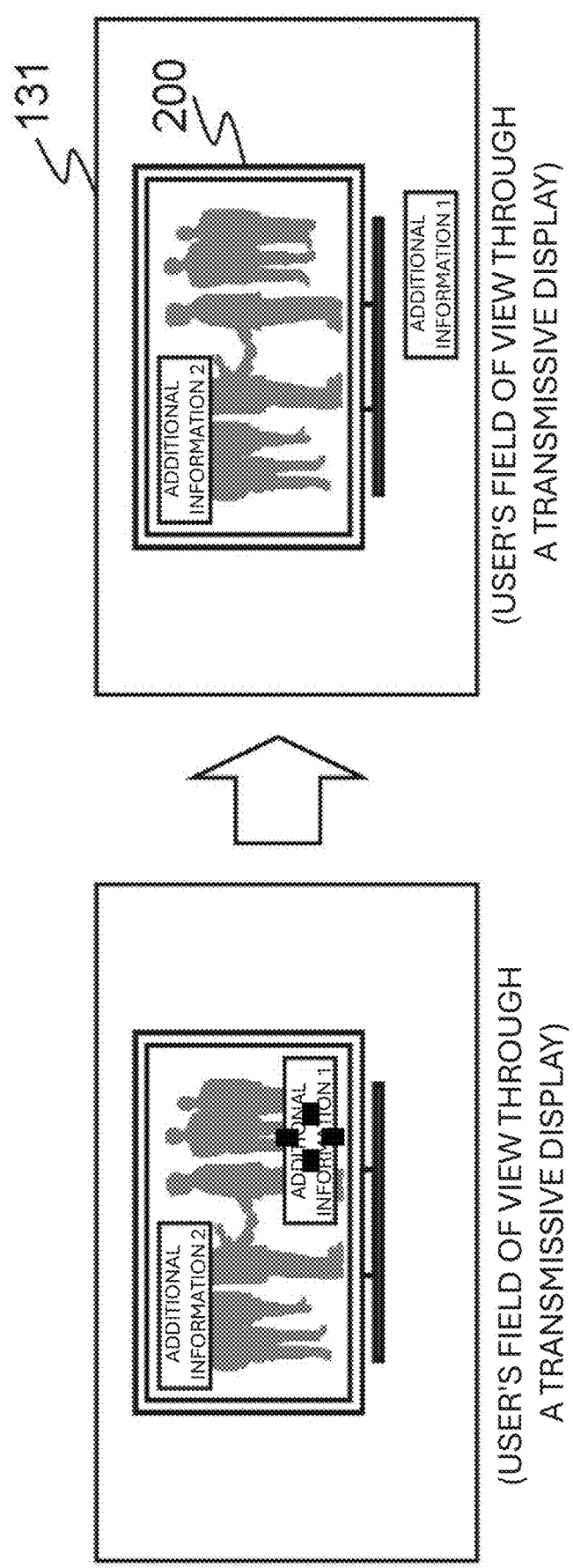

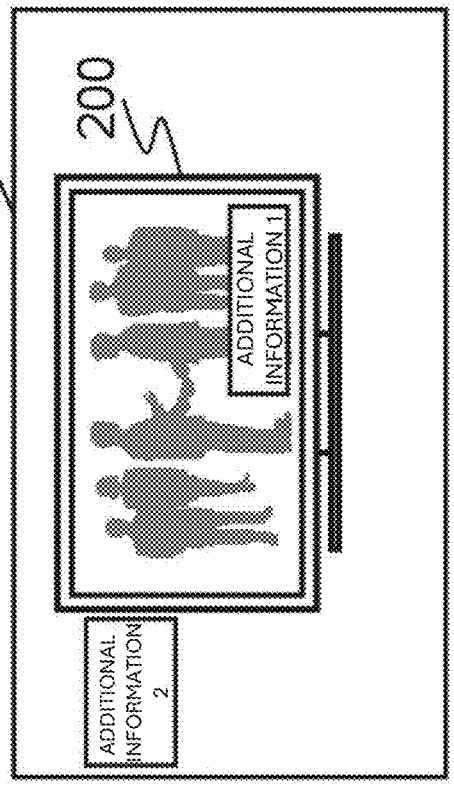
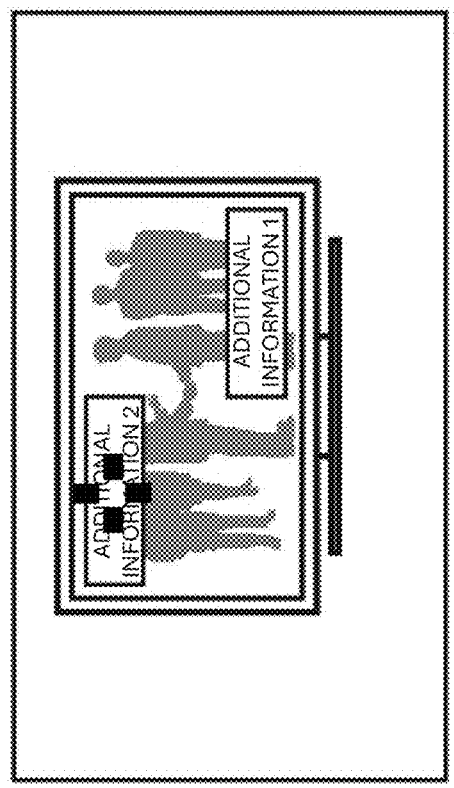
FIG. 12B

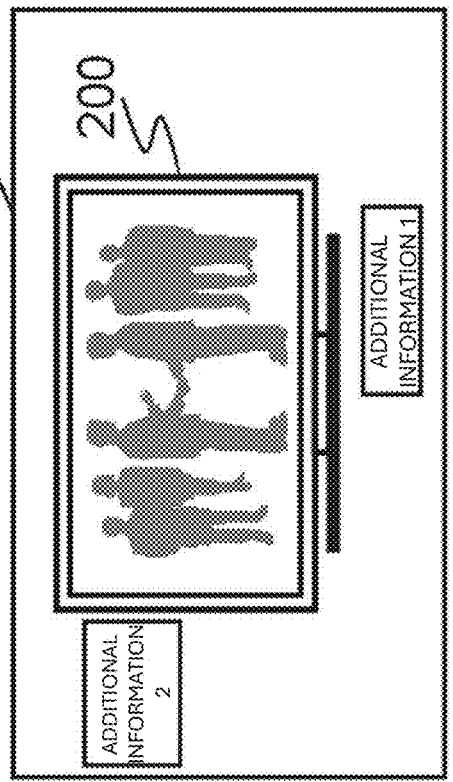
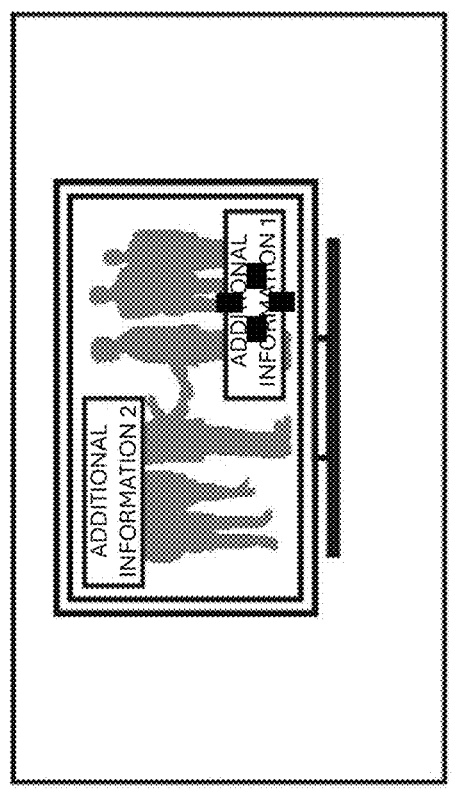
FIG.12C

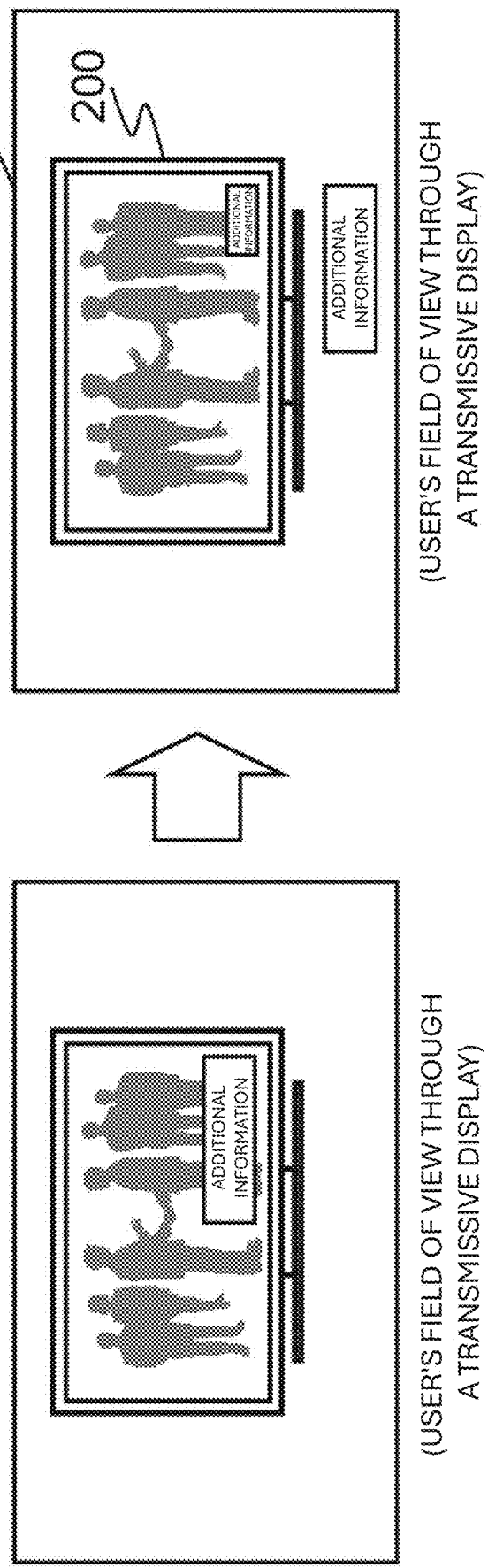

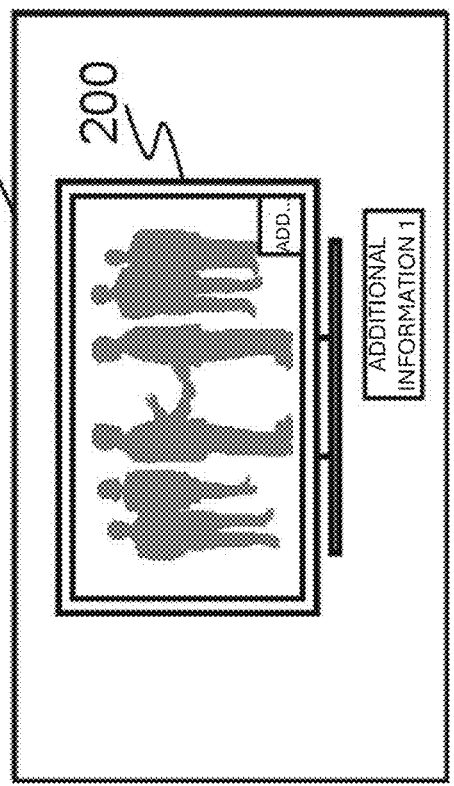

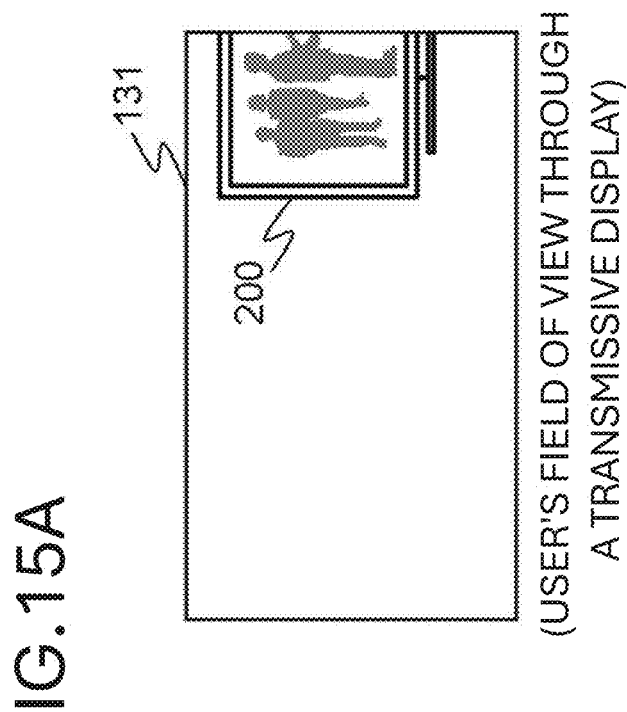
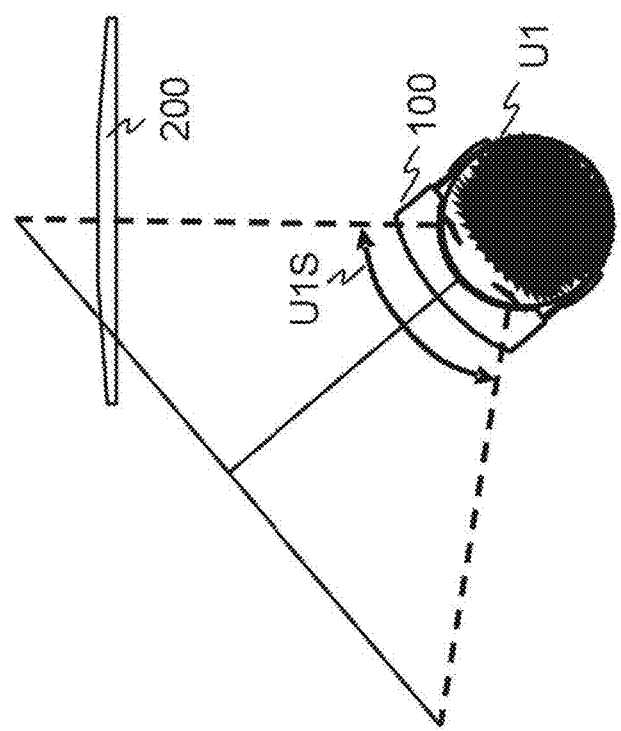
FIG. 15A

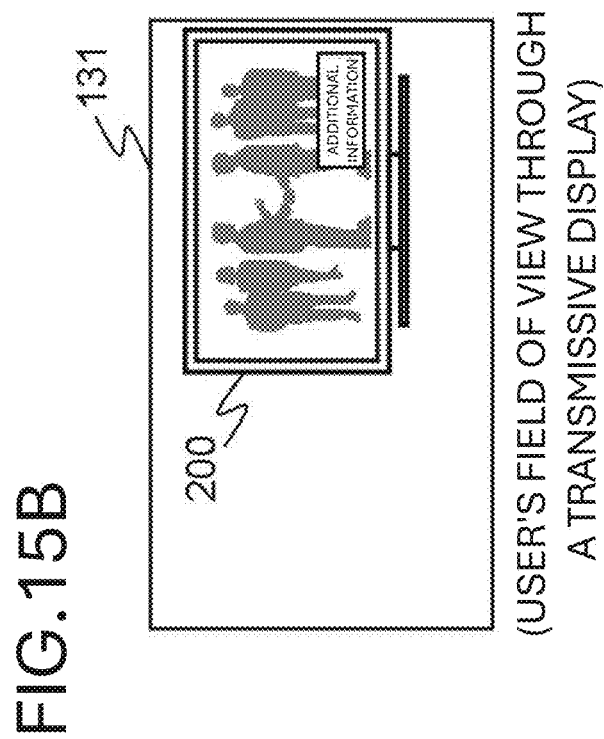
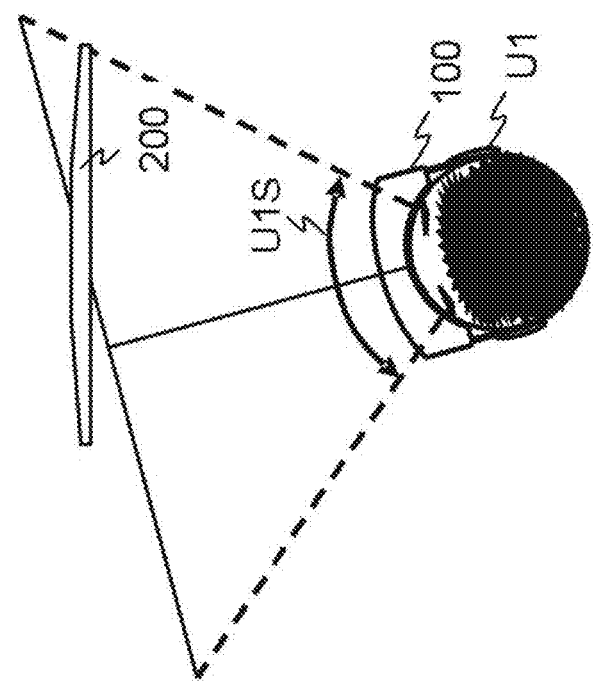
FIG.15B
(USER'S FIELD OF VIEW THROUGH A TRANSMISSIVE DISPLAY)

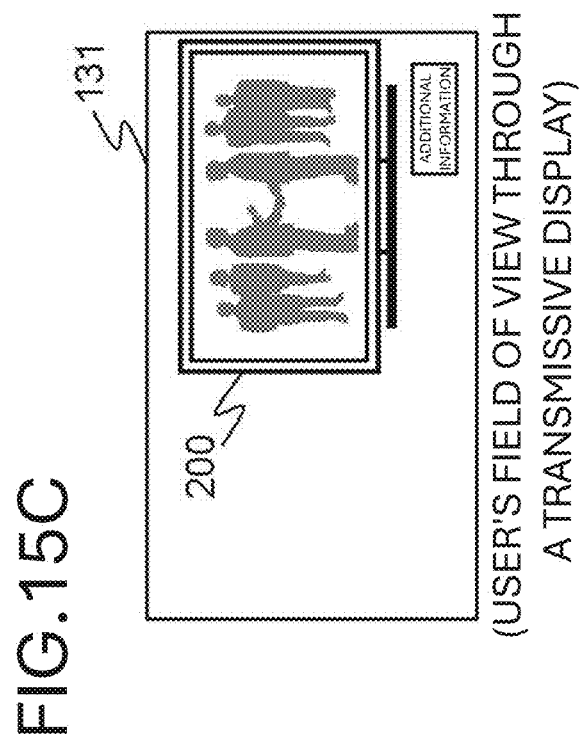
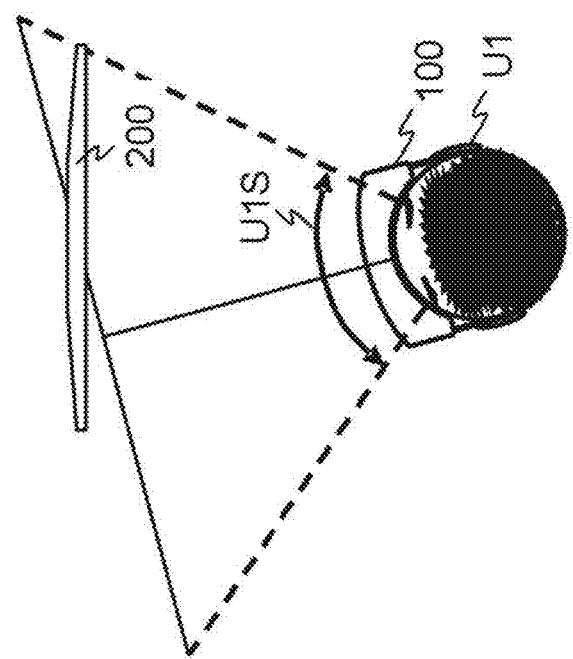
FIG.15C
(USER'S FIELD OF VIEW THROUGH A TRANSMISSIVE DISPLAY)

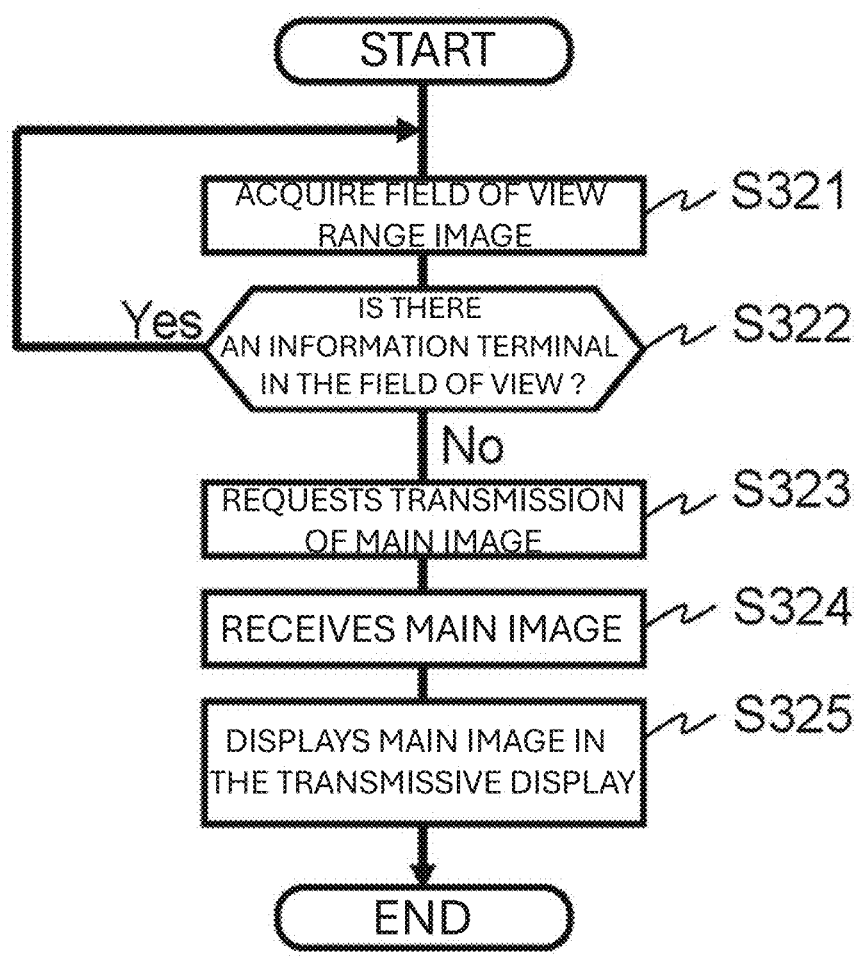

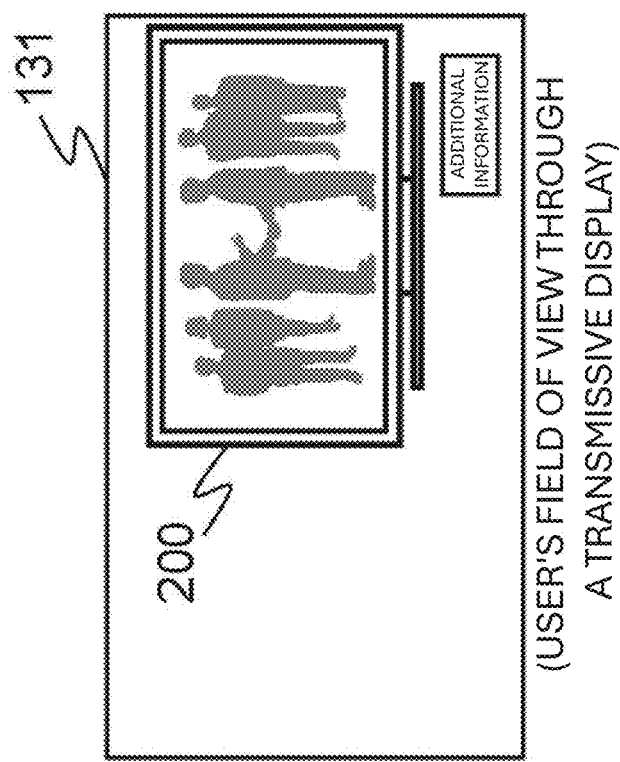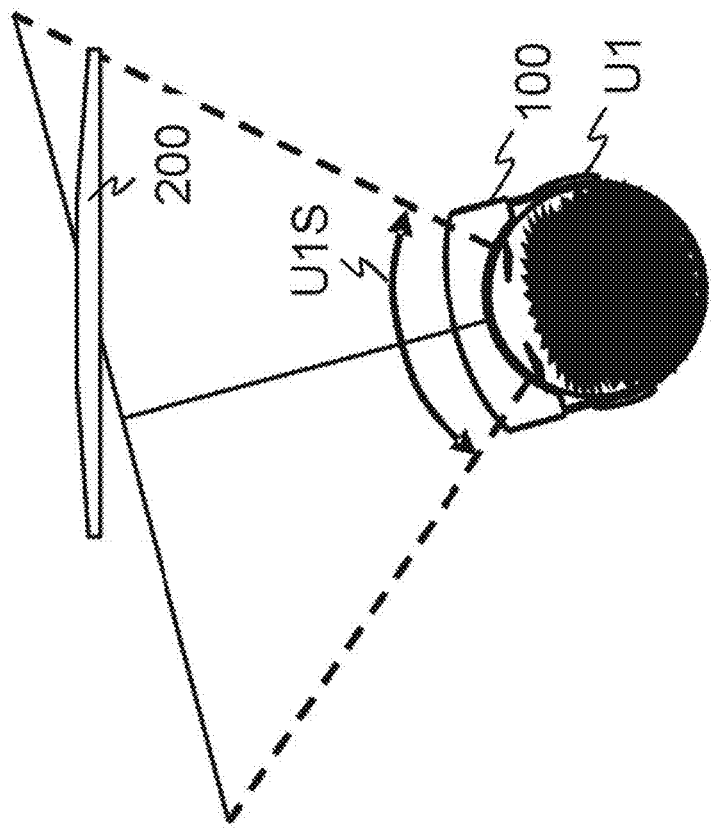
FIG.17A

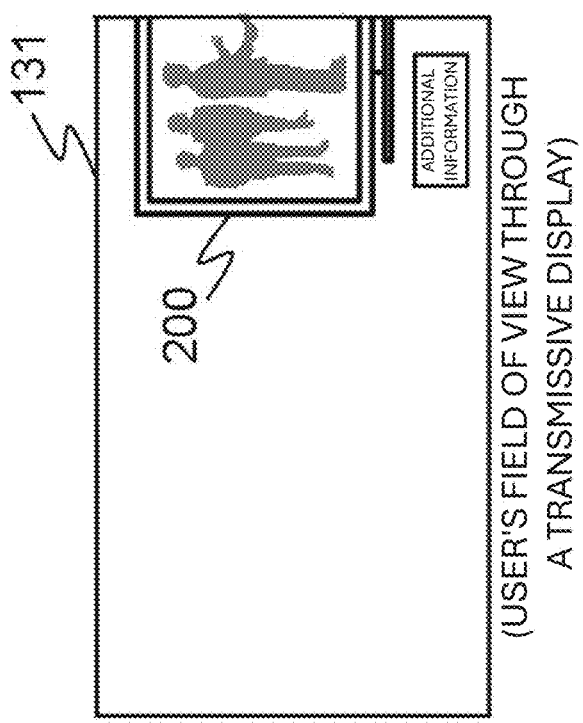
FIG.17B
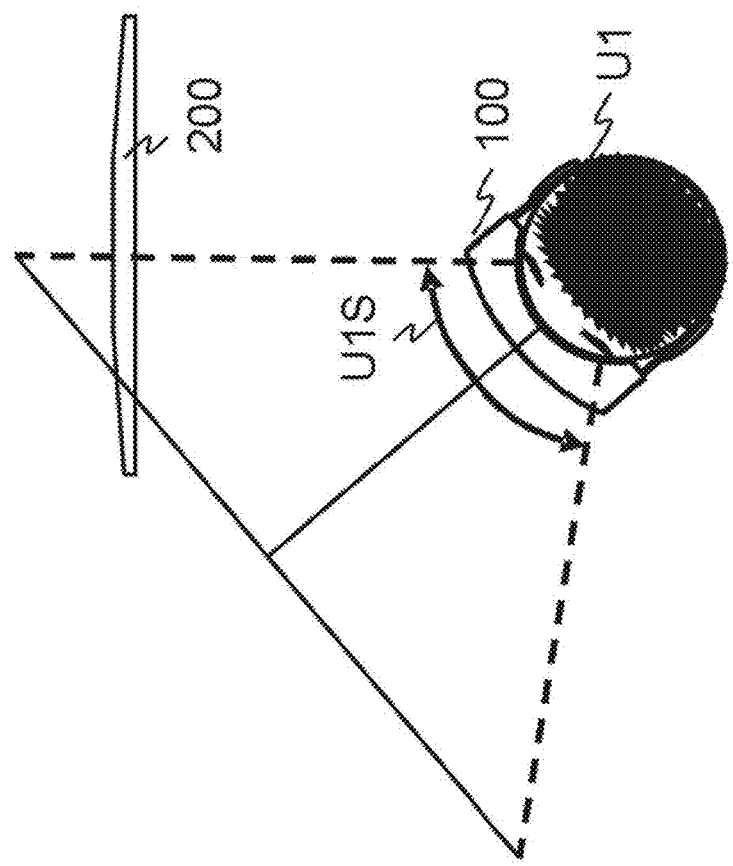

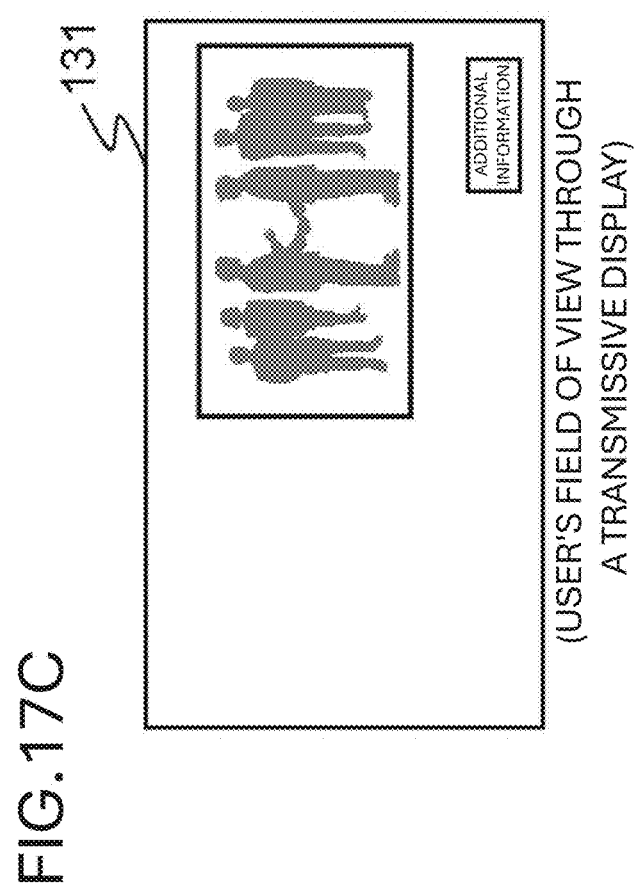
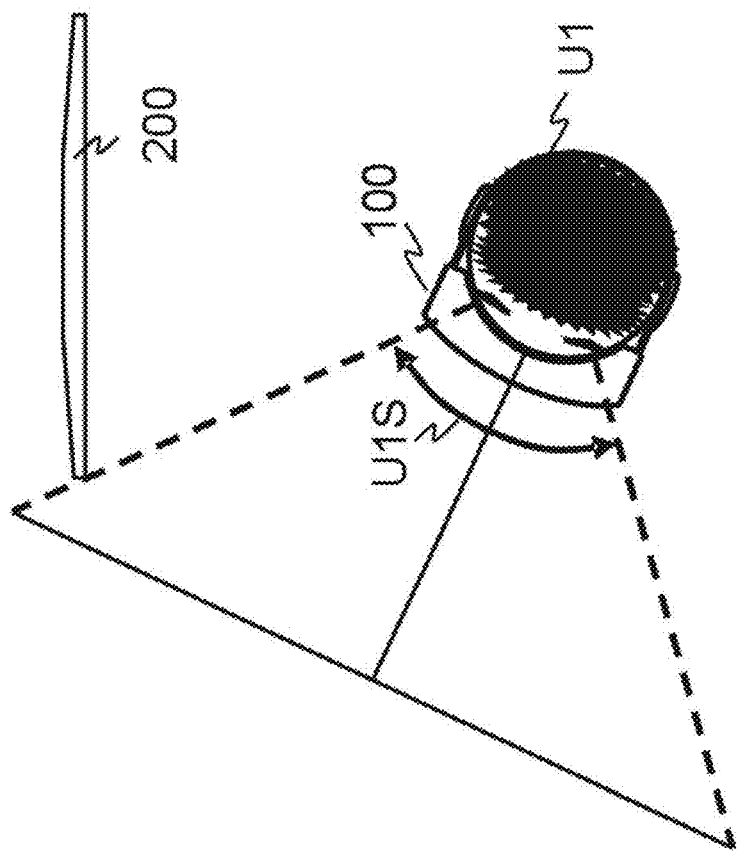
FIG. 17C

FIG.18
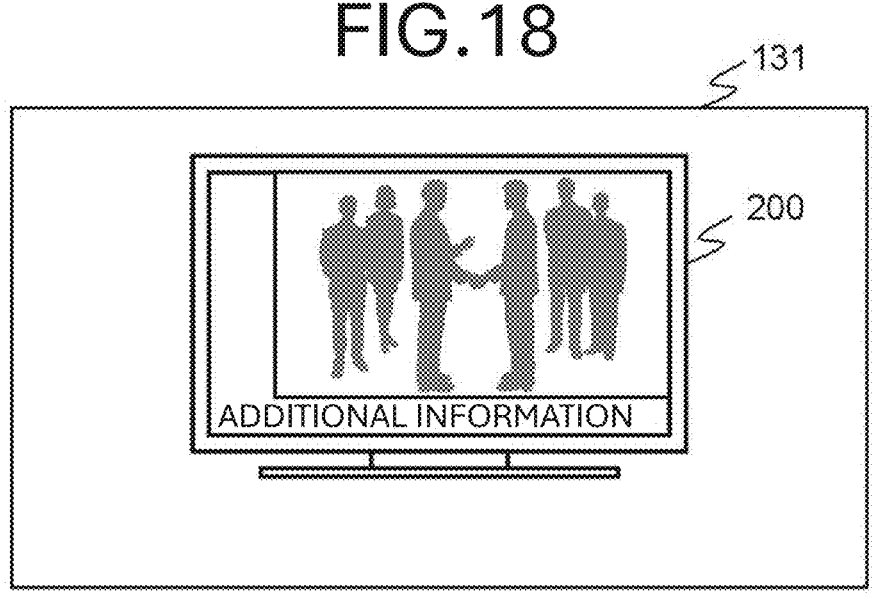
(USER'S FIELD OF VIEW THROUGH A TRANSMISSIVE DISPLAY)
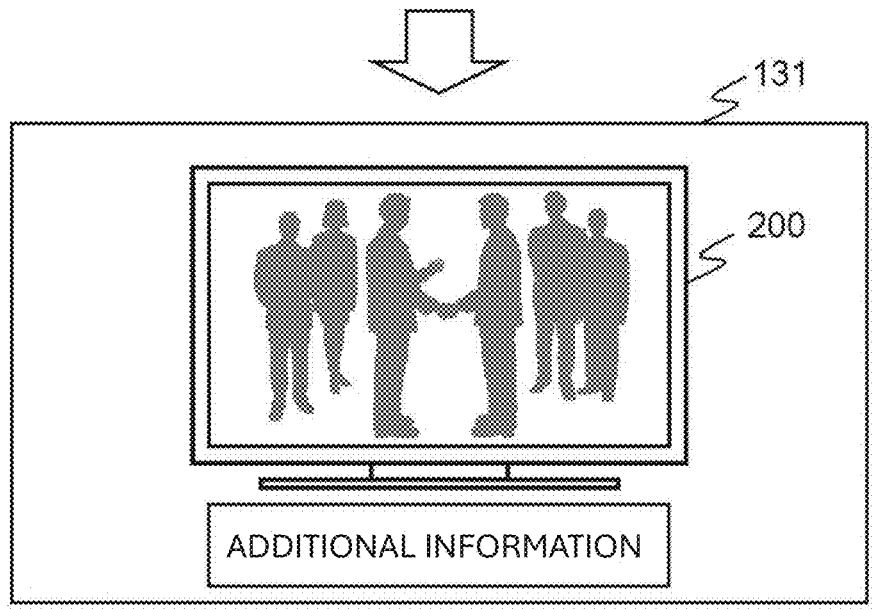
(USER'S FIELD OF VIEW THROUGH A TRANSMISSIVE DISPLAY)

FIG. 19
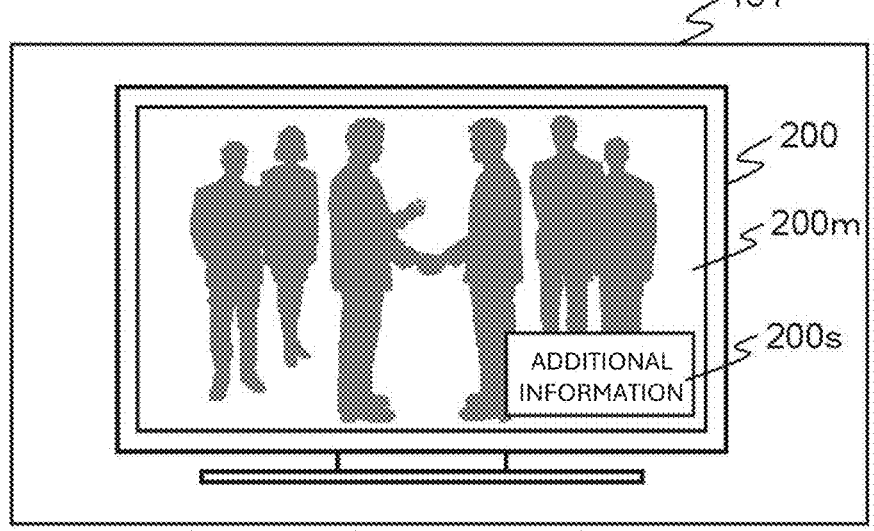
(USER'S FIELD OF VIEW THROUGH A TRANSMISSIVE DISPLAY)
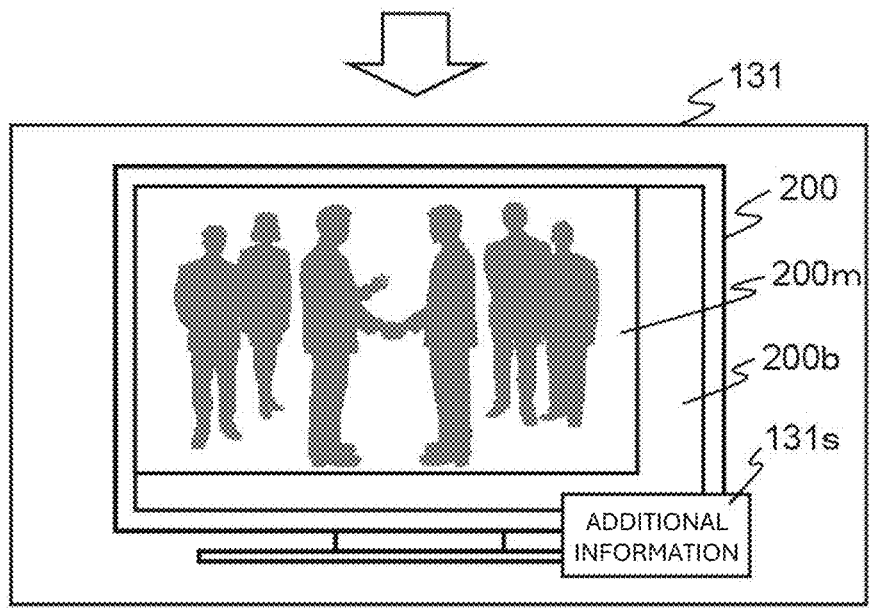
(USER'S FIELD OF VIEW THROUGH A TRANSMISSIVE DISPLAY)

HEAD MOUNTED DISPLAY APPARATUS

TECHNICAL FIELD

This invention relates to a head mounted display apparatus (hereinafter, referred to as HMD: Head Mounted Display) and in particular to the display of image added information.

BACKGROUND ART

HMDs, which are equipped with a display and worn on the head to view information, have been expanding their use in recent years for gaming applications and in the field of work support.

Here, when a user watches an information terminal (TV, smartphone, etc.) that displays additional information superimposed on the main image via the transparent display of the HMD, the user may find it difficult to see the main image due to the superimposition of additional information on the main image.

Patent document 1 is a background technology in this technical field. Patent document 1 discloses a video additional information display control device for displaying video images on a display device and displaying additional information on an HMD, and so that the additional information does not overlap with the displayed objects in the video image, and its method of operation.

CITATION LIST

Patent Literature

PTL 1: JP 2012-205191 A

SUMMARY OF INVENTION

Technical Problem

In Patent Document 1, video additional information display control device controls the display position of the additional information so that the additional information does not overlap the displayed objects in the image displayed on the HMD, and the HMD simply displays the additional information based on the control of the video additional information display control device. Therefore, the main body of control is the video additional information display control device, and it is problem that a video additional information display control device is required separately from the HMD.

In view of the above problem, the purpose of this invention is to provide an HMD that can control the display of additional information on the information terminal on the HMD display, when the information terminal, which displays additional information superimposed on the main image, is viewed via the HMD display.

Solution to Problem

The present invention comprises, in one example, the configuration is a head mounted display apparatus includes a transmissive display, comprising: an image capturing part acquires field of view range image, which is an image corresponding to the field of view range of user, an additional information presence/absence analysis part analyzes the acquired field of view range image, confirms whether an information terminal included in the field of view range of user, and confirms whether a display image of an information terminal included in the field of view range of user is the one in which additional information is superimposed on the main image, an additional information acquisition part requests the information terminal or contents server to send additional information, and receives the additional information, a display controller detects an information terminal visual recognition area that is an area where the information terminal is viewed in the transmissive display, and displays the received additional information in a position that does not overlap with the information terminal visual recognition area of the transmissive display.

Advantageous Effects of Invention

According to the present invention, it provides a HMD that can control the display of additional information.

BRIEF DESCRIPTION OF DRAWINGS

FIG. 8 is an explanatory diagram of the detection process of information terminal visual recognition area in FIG. 5.

FIG. 9 is an explanatory diagram of additional information display control processing of HMD in Example 1.

FIG. 10A is a diagram that illustrates the display control of additional information on the HMD when the user is facing forward to the information terminal in Example 2.

FIG. 10B is a diagram that illustrates the display control of additional information on the HMD when the user swings his/her head to the left and the position of the information terminal in the transmissive display moves relatively to the right, in Example 2.

FIG. 10C is a diagram that illustrates other display controls for additional information on the HMD when the user swivels his/her head to the left and the position of the information terminal in the transmissive display moves relatively to the right, in Example 2.

FIG. 12A is a diagram that illustrates the display control of the HMD's additional information in Example 3, when the user gives a selection instruction with state of keeping his/her line of sight on the additional information 1.

FIG. 12B is a diagram that illustrates the display control of the HMD's additional information in Example 3, when the user gives a selection instruction with state of keeping his/her line of sight on the additional information 2.

FIG. 12C is a diagram that illustrates other display controls of the HMD's additional information in Example 3, when the user gives selection instruction with state of keeping his/her line of sight on the additional information 1.

FIG. 13B is a diagram that illustrates the second process of controlling the display of additional information in Example 4.

FIG. 13C is a diagram that illustrates the third process of controlling the display of additional information in Example 4.

FIG. 15A is a diagram that illustrates the first state of display control of additional information in Example 5.

FIG. 15B is a diagram that illustrates the second state of display control of additional information in Example 5.

FIG. 15C is a diagram that illustrates the third state of display control of additional information in Example 5.

FIG. 16 is a flowchart of the HMD's additional information display control processing in Example 6.

FIG. 17A is a diagram that illustrates the first state of display control of additional information in Example 6.

FIG. 17B is a diagram that illustrates the second state of display control of additional information in Example 6.

FIG. 17C is a diagram that illustrates the third state of display control of additional information in Example 6.

FIG. 18 is an explanatory diagram of the additional information display control processing of HMD in Example 7.

FIG. 19 is an explanatory diagram of the additional information display control processing of HMD in Example 8.

DESCRIPTION OF EMBODIMENTS

The following is an example of the invention with drawings.

Example 1

Figure 1:
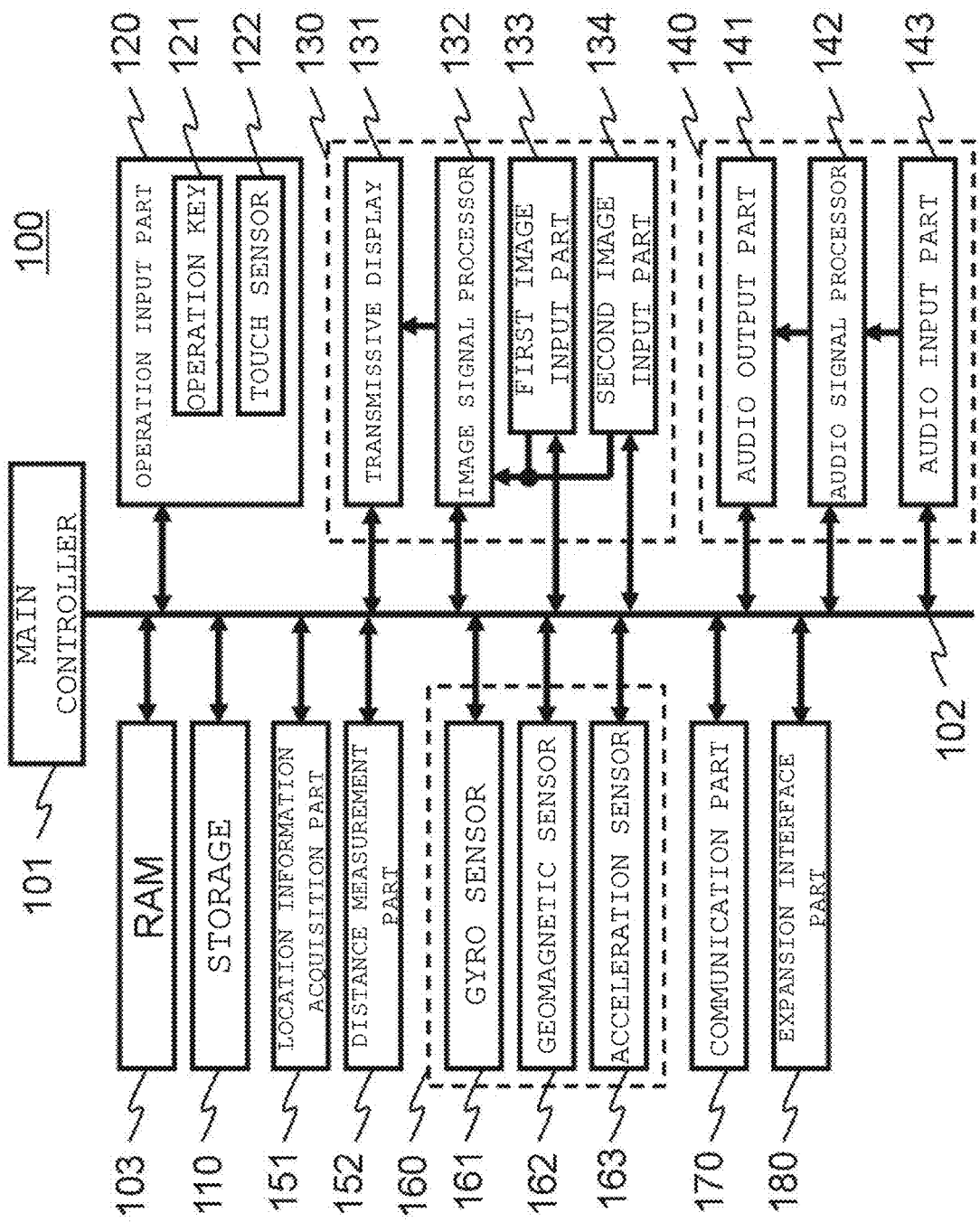
FIG. 1 is a block diagram showing the hardware configuration of the HMD in Example 1.

FIG. 1 is a block diagram showing the hardware configuration of the HMD 100 in this example. In FIG. 1, 101 is the main controller (CPU/MCU, etc.), 102 is the bus, which is the path for sending and receiving commands and data, 103 is RAM, which serves as the work area when executing the basic operation program and other operation programs, and 110 is storage, which is a nonvolatile storage medium such as FlashROM/EEPROM/SSD/HDD.

120 is the operation input part, which is the user operation interface, and has operation key 121 such as SWs, power and volume keys, and touch sensor 122 such as a touch pad.

130 is an image processor, such as an image (video) processor, having a transmissive display (display) 131, an image signal processor (image (video) signal processor) 132, a first image input part 133 that is an external camera for forward imaging, and a second image input part 134 that is an internal camera for line-of-sight detection.

140 is an audio processor, which has an audio output part (speaker) 141, an audio signal processor (audio signal processor) 142, and an audio input part (microphone) 143.

151 is the location information acquisition part (for receiving location information signals such as GPS signals). 152 is the distance measurement part, which has a distance sensor and/or a depth sensor. 160 is the sensor part, which has a gyro sensor 161, a geomagnetic sensor 162, and an acceleration sensor 163.

170 is a communication part (communication interface) consisting of a LAN (Wi-Fi (registered trademark)) communication part, mobile communication part, Bluetooth (registered trademark) communication part, etc., 180 is an expansion interface part, is such as a USB interface, is used for data transmission/reception, charging, etc.

Figure 2:
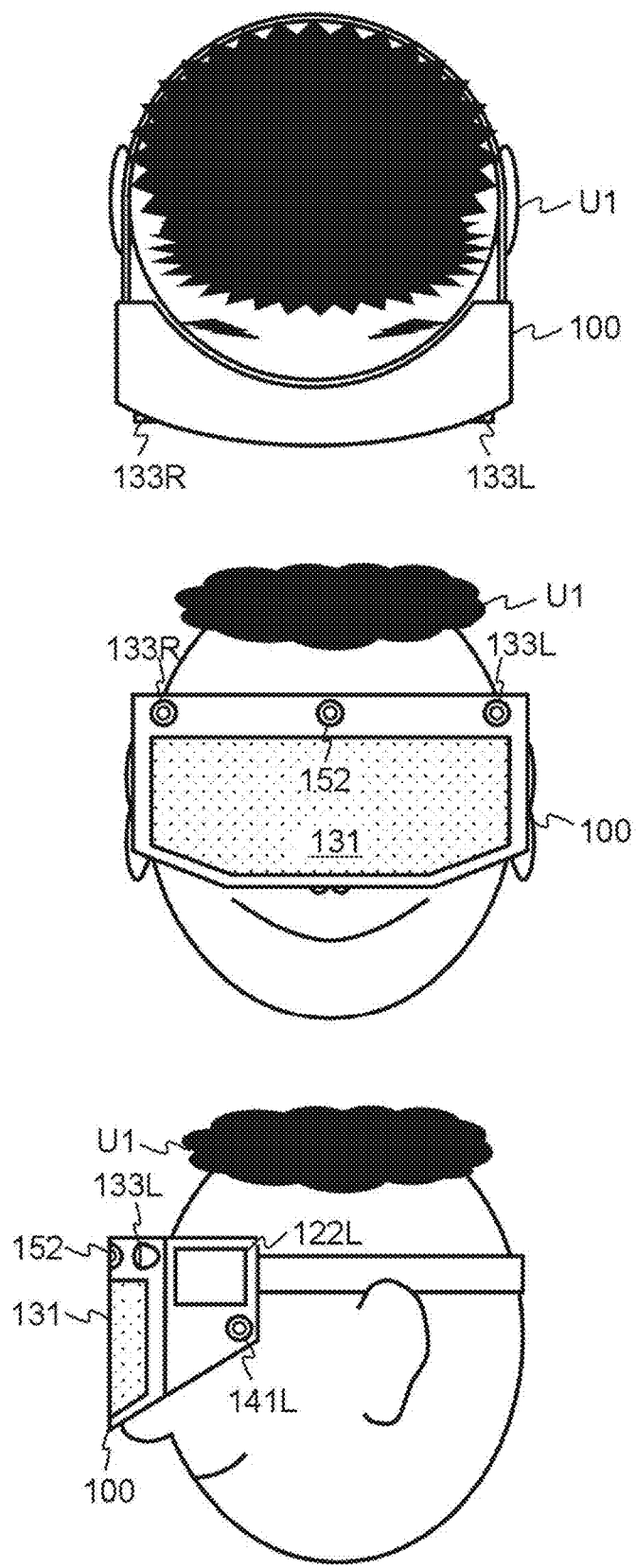
FIG. 2 is a diagram the appearance and mounting diagram of the HMD in Example 1.

FIG. 2 shows the appearance and mounting of the HMD in this example. In FIG. 2, the top diagram is a top view diagram of state that the HMD 100 worn on the head of user U1, the middle view diagram is a front view diagram, and the bottom view diagram is a side view diagram. The HMD 100 in this example is a goggle-type, optically transparent HMD with a window in the front, as shown in FIG. 2.

In FIG. 2, 131 is a transmissive display and the outside world can be directly viewed via (through) the transmissive display 131.

133L is a first image input part (L) that is the left external camera, and 133R is a first image input part (R) that is the right external camera. Note that, there can be only one first image input part (e.g., one first image input part 133 in the center). In this case, the distance measurement part 152 may be omitted. Also, it is camera that may be equipped with one image input device with the functions of first image input part 133 and distance measurement part 152, and acquire image information and distance information simultaneously by image input device.

Also, 122L is a touch sensor (L) and 122R is a touch sensor (R) (not shown), and only one of the left or right touch sensor may be used. Also, 141L is the audio output part (L) (stereo speaker L) and 141R is the audio output part (R) (stereo speaker R) (not shown). Although not shown in the figure, a monaural microphone may be provided as the audio input part 143.

Figure 3:
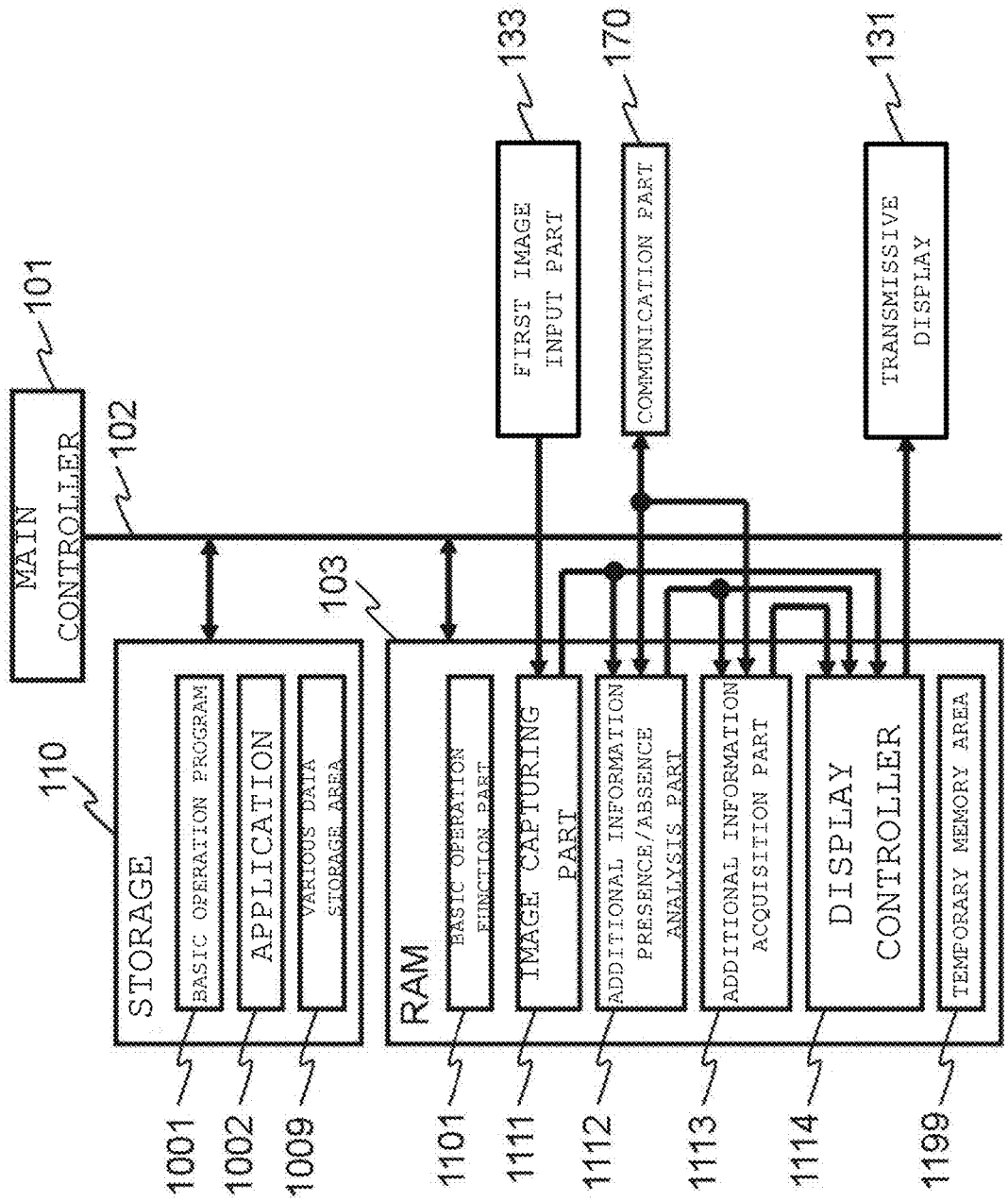
FIG. 3 is a diagram showing the functional configuration of the HMD in Example 1.

FIG. 3 is a functional configuration diagram of the HMD in this example. In FIG. 3, storage 110 consists of basic operation program 1001, which is a basic program such as an OS, application 1002, which includes an application that executes the functions of this example (hereinafter abbreviated as "application") and other applications, and various data storage area 1009, which is an area to store various operation setting values and various types of information (video, still image, sound, etc.).

The program/application stored in storage 110 is expanded (loaded) into RAM 103, and main controller 101 executes the expanded program/application, the functional part of this example and other functional parts are executed.

In FIG. 3, the execution programs to be deployed are listed by function in RAM 103. In other of words, it has a basic operation function part 1101 executes the basic operation program of the HMD 100, an image capturing part 1111 acquires the image (field of view range image) corresponding to the field of view range of user U1 wearing the HMD 100, an additional information presence/absence analysis part 1112 whether or not the displayed image of information termina 1200 included in the field of view range image obtained by image capturing part 1111 is the one in which additional information is superimposed on the main image, an additional information acquisition part 1113 acquires data related to additional information superimposed on the displayed image of information termina 1200 included in the field of view range image obtained by image capturing part 1111, and a display controller 1114 detects area (information terminal visual recognition area) occupied in the transmissive display 131 of the information terminal 200 included in the field of view range image obtained by image capturing part 1111 and controls display position and display presence of the additional information based on the detection result.

RAM 103 also has a temporary memory area 1199 that is a temporary storage area for various information created/obtained by the application.

Figure 4:
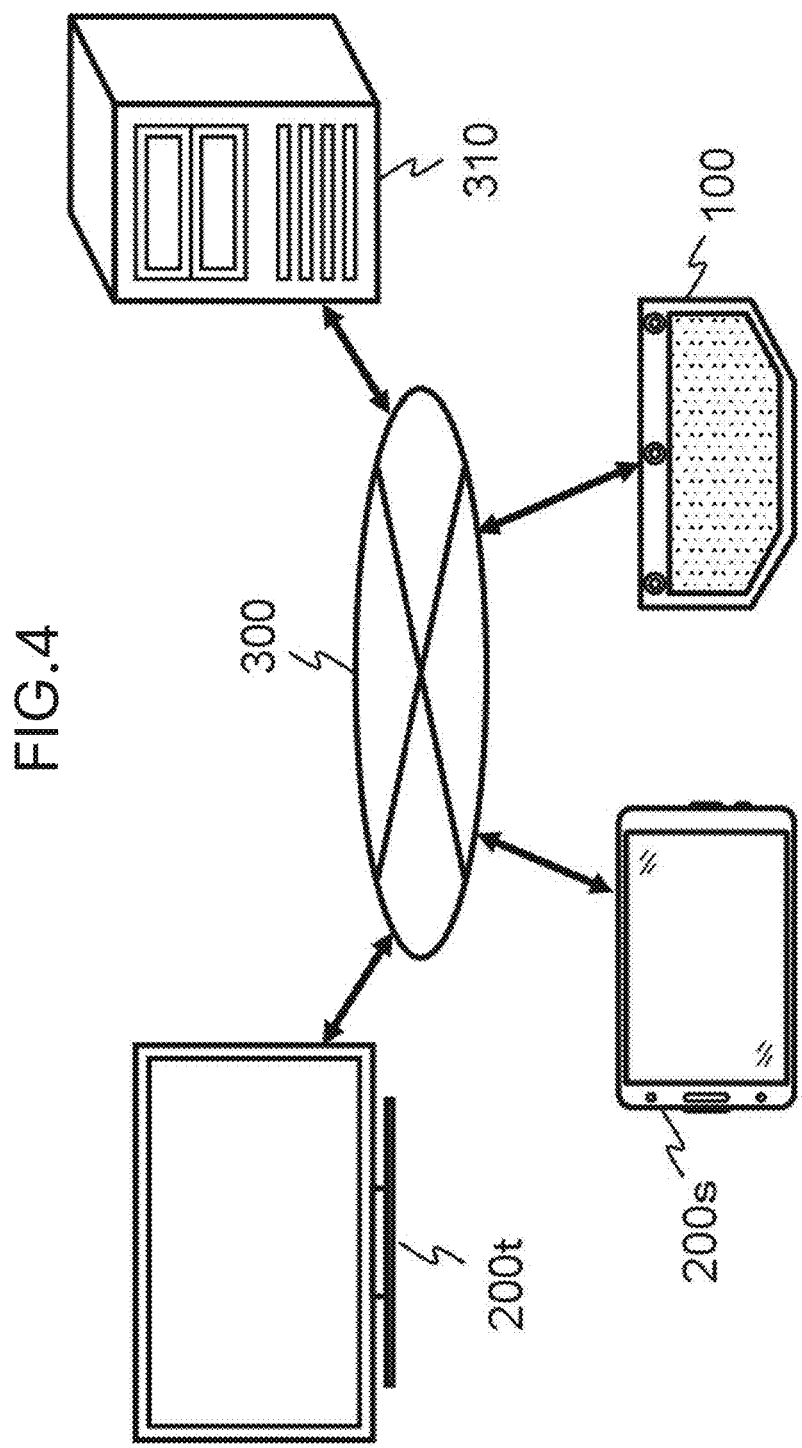
FIG. 4 is a diagram showing the system configuration in Example 1.

FIG. 4 is a system configuration diagram in this example. In FIG. 4, HMD 100 is connected via a network 300 such as the Internet to information terminals 200s such as smartphones and tablet terminals, information terminals 200t such as TVs and other display devices, and server apparatus 310 such as content servers.

Figure 5:
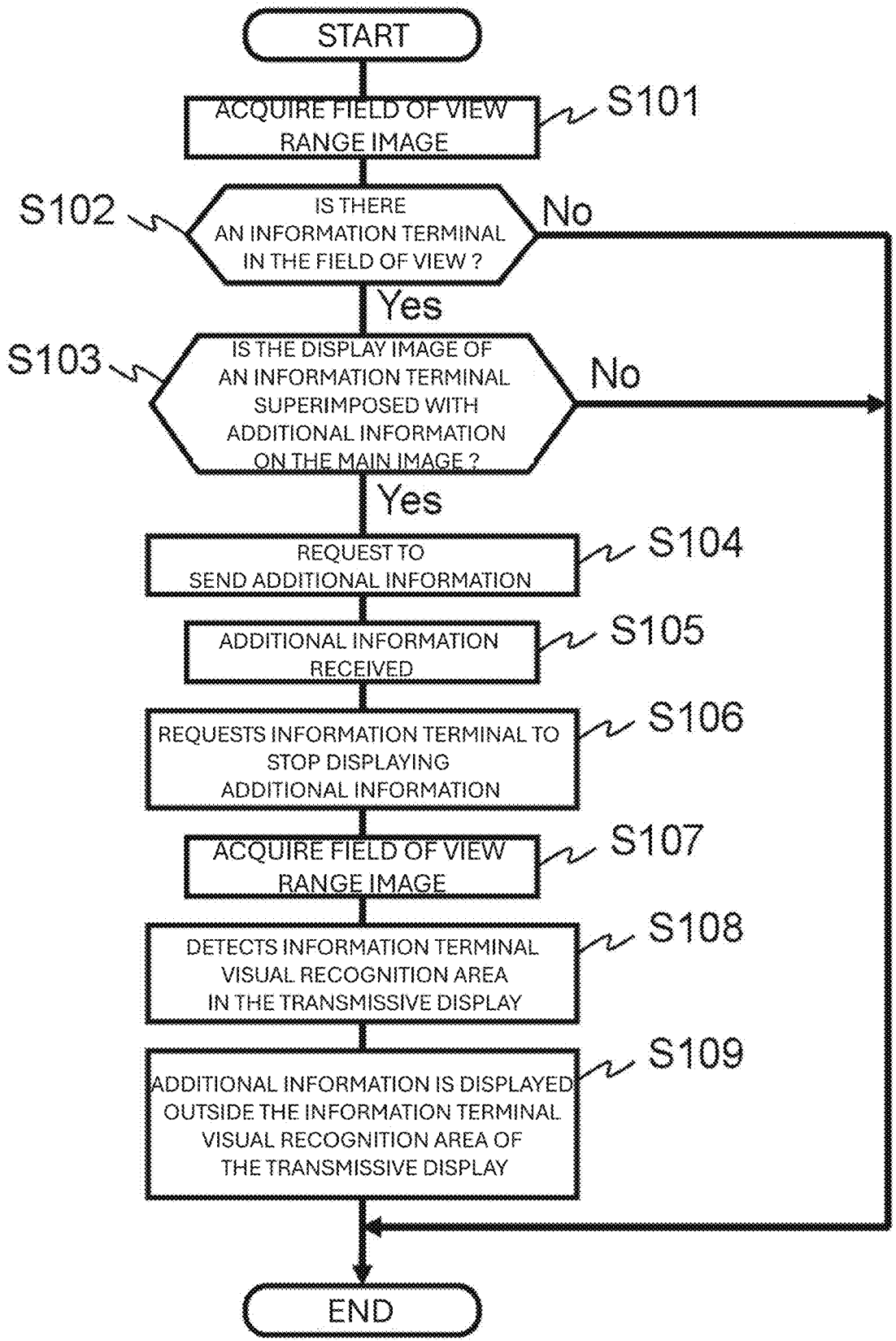
FIG. 5 is a flowchart of the HMD's additional information display control processing in Example 1.

FIG. 5 is a flowchart of the additional information display control processing of the HMD in this example. In FIG. 5, first, in step S101, image capturing part 1111 acquires a field of view range image, which is an image corresponding to the field of view range of user U1, from first image input part 133. Next, in S102, additional information presence/absence analysis part 1112 analyzes the field of view range image of user U1 obtained in S101 process and confirms whether the information terminal is included in the field of view range of user U1. If the information terminal 200 is included in the field of view range of user U1, proceed to S103. If the information terminal 200 is not included in the field of view range of user U1, the process ends.

In S103, the additional information presence/absence analysis part 1112 analyzes the field of view range image of user U1 obtained in the process of S101 and confirms whether the display image of the information terminal 200 included in the field of view range of user U1 is the one in which additional information is superimposed on the main image. If the additional information is superimposed on the main image, the process proceeds to S104. If the additional information is not superimposed on the main image (only the main image), the process ends.

In S104, additional information acquisition part 1113 requests information terminal 200 or server apparatus 310, which is a contents server, to send additional information. Then, in S105, additional information acquisition part 1113 receives the additional information from information terminal 200 or server apparatus 310. Note that, if the additional information cannot be received within a predetermined time, the process may finish. Then, at S106, additional information acquisition part 1113 sends a request to stop displaying the additional information, to information terminal 200.

Then, in S107, image capturing part 111 acquires the field of view range image, which is the image corresponding to the field of view range of user U1, from first image input part 133. Note that, the field of view range image obtained in S101 may be used in subsequent processes, without processing S107.

Then, at S108, the display controller 1114 analyzes the field of view range image of user U1 obtained in the process of S107, and detects the information terminal visual recognition area, which is the area in which the information terminal 200 is visible in the transmissive display 131. Then, in S109, the display controller 1114, displays the additional information received from the information terminal 200 or server apparatus 310 in the process of S105, at a predetermined position on the transmissive display 131 that does not overlap with the information terminal visual recognition area detected in the S108 process. Note that, if the additional information remains displayed on the information terminal 200 after the processing of S106, the processing of S107 to S109 may not be performed.

Figure 6:
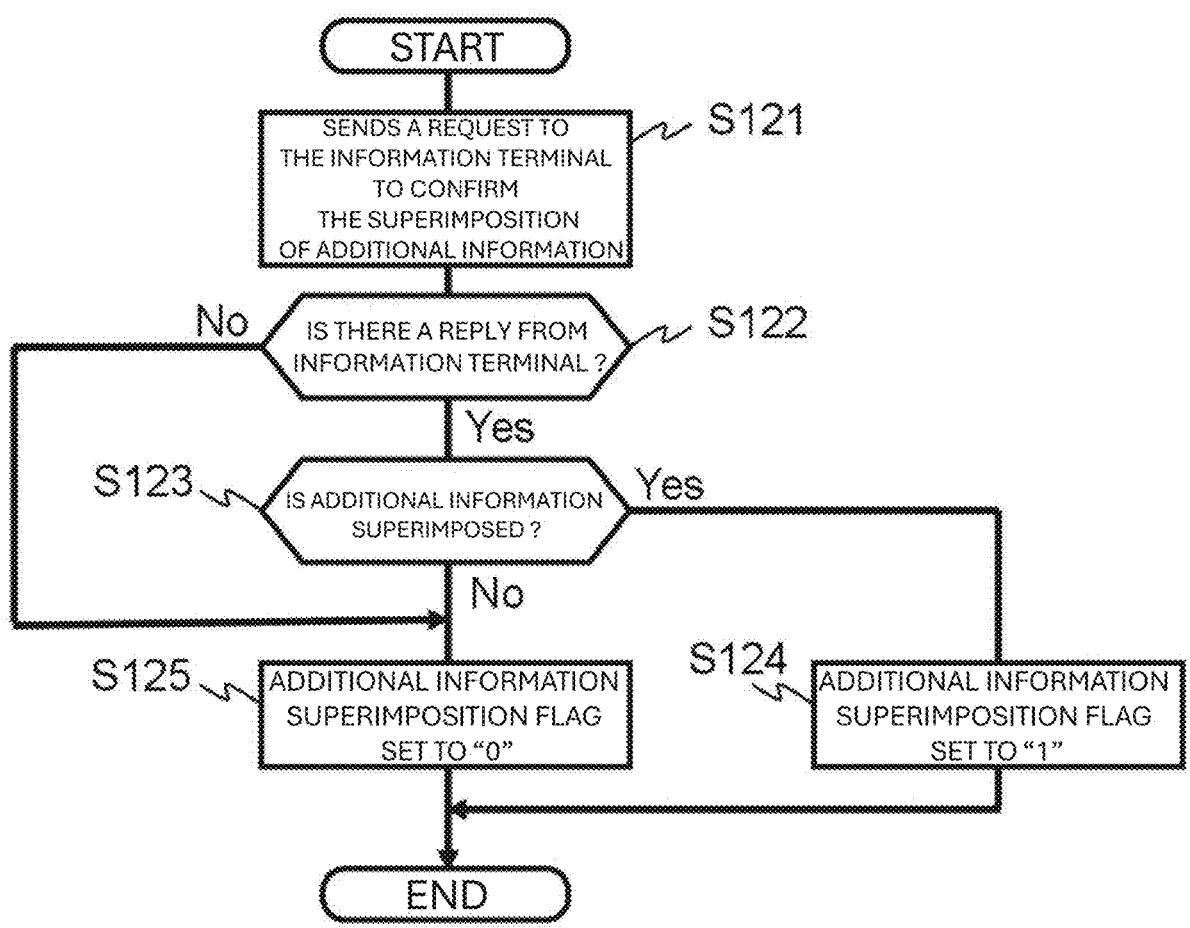
FIG. 6 is a detailed flowchart of the additional information presence/absence analysis process in FIG. 5.

FIG. 6 is a detailed flowchart of the additional information presence/absence analysis process of S103 in FIG. 5. In FIG. 6, first, at step S121, the additional information presence/absence analysis part 1112 sends to the information terminal 200, which is connected via communication part 170 on the same network 300, the confirmation request whether the display image of information terminal 200 is the one in which additional information is superimposed on the main image. Note that, the information terminal 200 is linked to the HMD 100 within a narrow network such as LAN or Bluetooth.

Then, at S122, the additional information presence/absence analysis part 1112 confirms whether or not a reply to the confirmation request sent in process of S121 is received from the information terminal 200. If the reply from the information terminal 200 is received within the predetermined time, the process proceeds to S123. If the reply from the information terminal 200 is not received within the predetermined time, the process proceeds to S125.

In S123, the additional information presence/absence analysis part 1112 confirms, based on the reply from the information terminal 200, whether the image displayed of the information terminal 200 is the one in which additional information is superimposed on the main image. Then, if the displayed image is that additional information superimposed on the main image, the process proceeds to S124. If the displayed image is that additional information is not superimposed on the main image, the process proceeds to S125.

In S124, the additional information presence/absence analysis part 1112 sets the additional information superimposition flag to "1" and branches to "Yes" in the process of S103.

In S125, the additional information presence/absence analysis part 1112 sets the additional information superimposition flag to "0" and branches to "No" in the process of S103.

Figure 7:
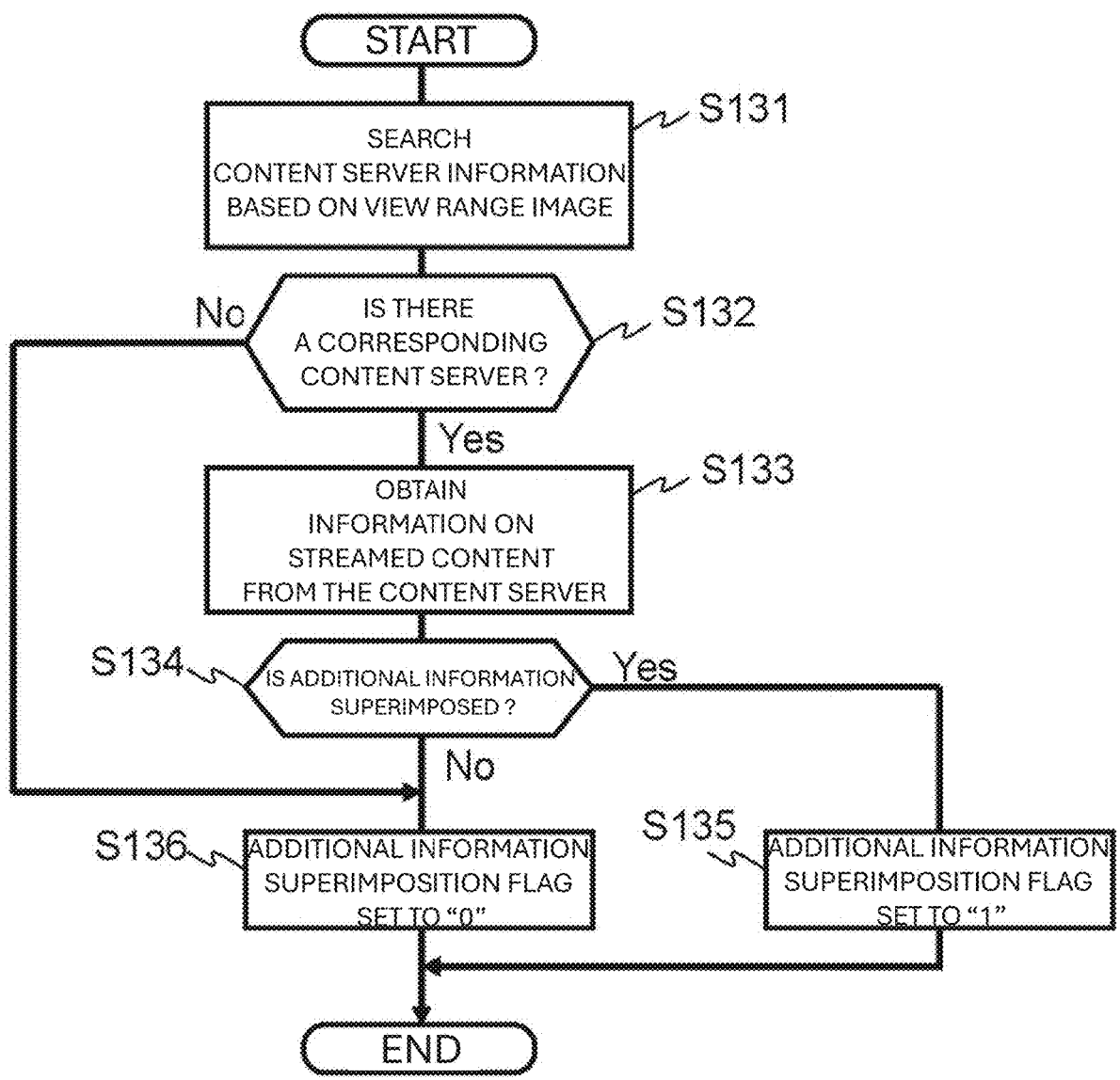
FIG. 7 is a detailed flowchart of the other additional information presence/absence analysis process in FIG. 5.

FIG. 7 is a detailed flowchart of the other additional information presence/absence analysis process of S103 in FIG. 5. FIG. 7 confirms whether or not the displayed image of the information terminal 200 included in the field of view range is the one in which additional information is superimposed on the main image, based not on the information terminal 200, but on the information from the server apparatus 310 that is content server via network.

In FIG. 7, first, in step S131, additional information presence/absence analysis part 1112 extracts the display image part of the information terminal 200 from the field of view range image of user U1 obtained in processing S101, performs search process on the network 300 based on the extracted display image, and obtains information about the server apparatus 310 that provides the main image (and/or additional information) to the information terminal 200. Then, at S132, the additional information presence/absence analysis part 1112, by the process of S131, confirms whether the information about server apparatus 310 that provides the main image (and/or additional information) to the information terminal 200 can be obtained. If the information about the server apparatus 310 can be obtained, the process proceeds to S133. If the information about the server apparatus 310 cannot be obtained, the process proceeds to S136.

In S133, the additional information presence/absence analysis part 1112 sends the display image part of the information terminal 200 extracted in the process of S131 to the server apparatus 310, and server apparatus 310 obtains information about the main image (and/or additional information) to be supplied information terminal 200.

Then, at S134, the additional information presence/absence analysis part 1112 confirms whether or not the display image of the information terminal 200 is one in which additional information is superimposed on the main image, based on the image of the display image part of the information terminal 200 extracted in the process of S131 and the information about the main image (and/or additional information) that the server apparatus 310 supplies to the information terminal 200 obtained in the process of S133. Then, if the displayed image is that additional information is superimposed on the main image, the process proceeds to S135. Also, if the displayed image is that additional information is not superimposed on the main image, the process proceeds to S136.

In S135, as in S124 of FIG. 6, the additional information presence/absence analysis part 1112 sets the additional information superimposition flag to "1", and branches to "Yes" in process S103.

In S136, as in S125 of FIG. 6, the additional information presence/absence analysis part 1112 sets the additional information superimposition flag to "0", and branches to "No" in process S103.

FIG. 8 is an explanatory diagram of the detection process of information terminal visual recognition area of S108 in FIG. 5. The upper diagram in FIG. 8 is the field of view of user U1 through the transmissive display 131, showing the real world information terminal 200 that user U1 sees through the transmissive display 131. The lower diagram in FIG. 8 is a diagram to illustrates the information terminal visual recognition area within the transmissive display 131, and shows the information terminal visual recognition area 131R detected in the processing of S108, for real world information terminal 200 as seen by user U1 through the transmissive display 131.

Note that, the information terminal visual recognition area 131R does not need to be similarity in shape to the enclosure as shown in the figure, for example, it may be a simple rectangle. Also, the information terminal visual recognition area 131R may be shaped to enclose only the display image part of the information terminal 200. Also, the additional information received from the information terminal 200 is not displayed inside the information terminal visual recognition area 131R, but may be displayed anywhere outside the information terminal visual recognition area 131R.

FIG. 9 is an explanatory diagram of additional information display control processing of HMD in this example. As shown in the upper diagram in FIG. 9, when the image displayed on the information terminal 200 is viewed through the HMD 100's transmissive display 131, if it determines that the image displayed on the information terminal 200 is a main image (program content, etc.) with additional information (subtitle information, etc.) superimposed on it, (1) The HMD 100 requests the information terminal 200 to stop transmitting and displaying the additional information. (2) The HMD 100 receives the additional information from the information terminal 200. (3) Based on the field of view range image of the user acquired by the camera of the HMD 100, the information terminal visual recognition area in the transmissive display 131 of the HMD 100 is detected. Then, as shown in the lower figure in FIG. 9, (4) the HMD 100 displays the additional information received in (2) in a position that does not overlap with the information terminal visual recognition area 131R detected in (3) on the transmissive display 131 of the HMD 100. Note that, if it is determined that only the main image is displayed and no additional information is superimposed, the processes (1) through (4) above are not performed.

To determine whether or not additional information is superimposed on the main image, the HMD 100 asks the information terminal 200 whether or not the displayed image is one in which additional information is superimposed on the main image. Also, the HMD 100 asks the content server supplying the main image to the information terminal 200 about the main image and additional information. Note that, other methods may be used to determine this.

Also, the display of the HMD 100 may be non-transmissive. In this case, in the display control described in (4) above, the field of view range image of the user acquired by the camera of the HMD 100 should be displayed on the non-transmissive display, and at a position that does not overlap with the area where the information terminal is displayed, the additional information received in (2) should be superimposed and displayed.

Also, the HMD 100 may be of a goggle type as shown or the like other, the HMD 100 may be a glasses type or the like. Also, the information terminal 200 may be a TV set in a room, a hand-held smartphone, or other information device.

As described above, this example provides an HMD that can control the display of additional information on the HMD's display, when the information terminal, in which additional information is superimposed on the main image and is displayed, is viewed through the HMD's display, it displays the additional information of the information terminal in a position that does not overlap with the main image of the information terminal on the HMD's display.

Example 2

This example describes the details of the display position of additional information in the additional information display control processing.

FIGS. 10a, 10b, and 10c are diagrams that illustrating the display control of additional information in this example. FIG. 10A is the case where user U1 is facing the information terminal 200, shows the state of additional information is displayed in a position that does not overlap with the information terminal visual recognition area in the transmissive display 131 by the control in Example 1. Note that, U1S indicates the field of view range of user U1.

FIG. 10B shows the first state in which user U1 swivels his/her head to the left from the state in FIG. 10A and the position of the information terminal 200 in the transmissive display 131 moves relatively to the right. In this case, the display position of the additional information in the transmissive display 131 is the same position as in FIG. 10A. That is, the display position of the additional information is fixed at a predetermined position in the transmissive display 131.

FIG. 10C shows the second state in which user U1 swivels his/her head to the left from the state in FIG. 10A as in FIG. 10B, and the position of the information terminal 200 in the transmissive display 131 moves relatively to the right. In this case, the display position of the additional information in the transmissive display 131 may be moved to the right in accordance with the information terminal 200. That is, the display position of the additional information may be fixed in a position relative to the information terminal 200.

Note that, the display position of additional information may be outside of the information terminal visual recognition area, is in the background area where the additional information is most easily seen. For example, if the background area consists of a patterned curtain and a white wall, it controls such as displaying additional information so that it overlaps with the white wall.

According to this example provides an HMD that can control the display of additional information on the HMD's display, when viewing an information terminal with additional information superimposed on the main image and displayed via the HMD display, it displays the additional information of the information terminal in a position where it does not overlap with the main image of the information terminal on the HMD display and in a position where the additional information is easy to see.

Example 3

This example describes the display control process for user-selected additional information.

Figure 11:
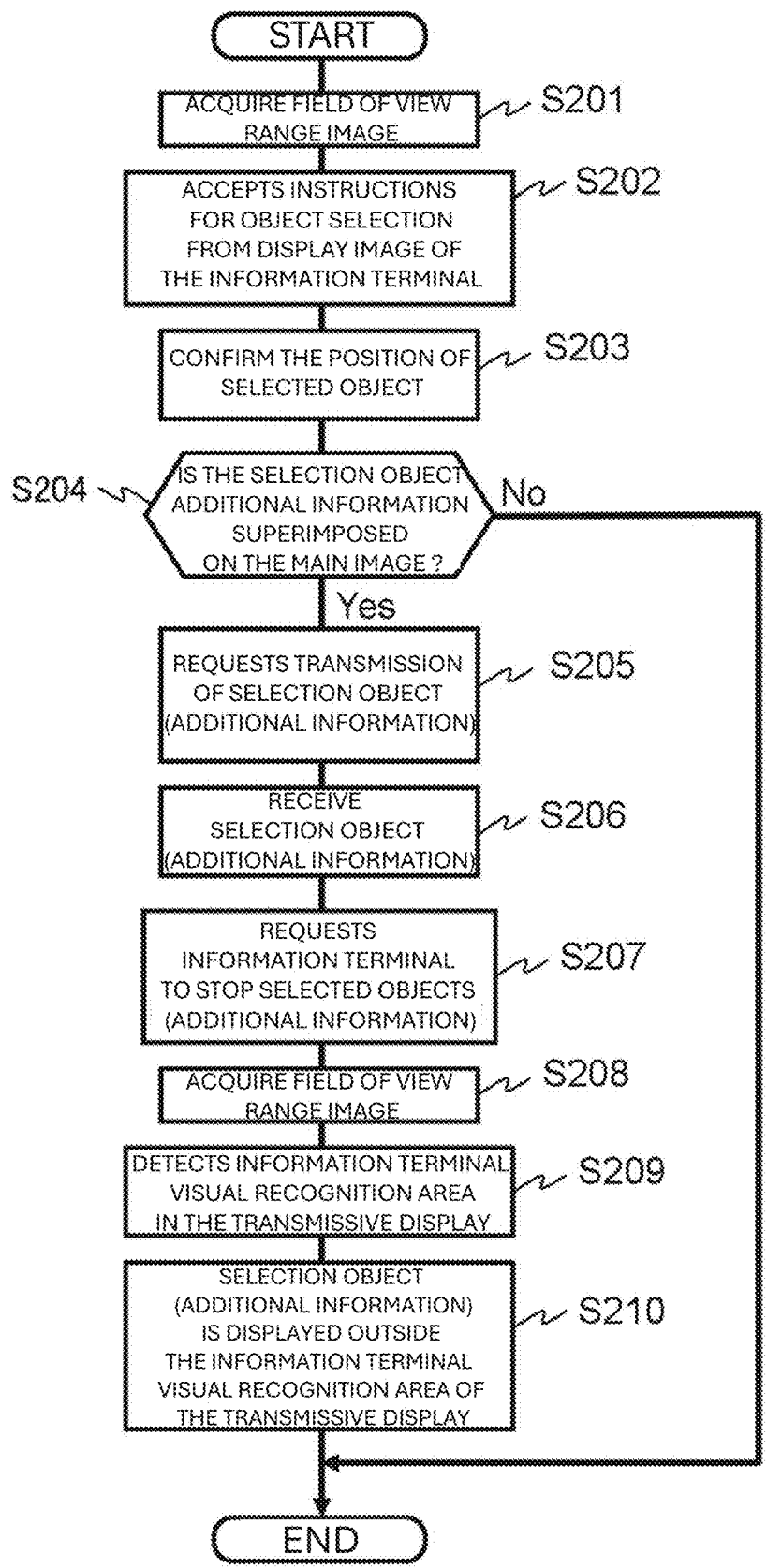
FIG. 11 is a flowchart of the HMD's additional information display control processing in Example 3.

FIG. 11 is a flowchart of the additional information display control processing of the HMD in this example. The flowchart shown in FIG. 11 is a variant of the additional information display control processing described in Example 1.

In FIG. 11, first, in step S201, image capturing part 1111 acquires an image (field of view range image) corresponding to the field of view range of user U1 from first image input part 133. Then, in S202, the additional information presence/absence analysis part 1112 accepts the user U1's selection instruction for any object on the display image of the information terminal 200, based on the field of view range image of user U1 acquired in process of S201. Then, in S203, the additional information presence/absence analysis part 1112 confirms the position of the object selected by the user U1 in the process of S202 (selection object) in the display image of the information terminal 200.

Next, in S204, the additional information presence/absence analysis part 1112 confirms whether the selection object whose position in the displayed image of the information terminal 200 was confirmed in the process of S203 is additional information superimposed on the main image. If the selection object is additional information superimposed on the main image, the process proceeds to S205. If the selection object is not additional information superimposed on the primary image, i.e., it is part of the main image, the process ends.

At S205, the additional information acquisition part 1113 requests the information terminal 200 or the server apparatus 310, which is the content server, to send the additional information, which is the selection object. Then, at S206, additional information acquisition part 1113 receives the selection object (additional information) from information terminal 200 or server apparatus 310.

In SS207, additional information acquisition part 1113 sends a request to stop displaying the selected object (the additional information), to information terminal 200. Then, in S208, image capturing part 1111 acquires an image (field of view range image) corresponding to the field of view range of user U1 from first image input part 133.

In S209, the display controller 1114 analyzes the field of view range image of user U1 obtained in the process of S208 and detects the area (information terminal visual recognition area) in which the information terminal 200 is visible in the transmissive display 131. Then, in S210, the display controller 1114 displays the selected object (additional information) received from the information terminal 200 or server apparatus 310 in the process of S206, at a predetermined position on the transmissive display 131 that does not overlap with the information terminal visual recognition area detected in the S209 process.

Note that, Specific examples of the user U1's selection instructions for arbitrary objects in S202 include the following. In state of the user U1 gazes at any object on the display image shown on the information terminal 200 via the transmissive display 131, (1) the touch sensor 122 detects a tap operation by the user U1, or (2) the second image input part 134 detects a blinking operation by user U1.

Also, specific examples of the process of confirming the position of the selected object in S203 are as follows. (1) Second image input part 134 acquires the eye image of user U1 at the time of the selection instruction by user U1. (2) The acquired eye image is analyzed to detect the coordinates on the transmissive display 131 where the user U1's line of sight intersects. (3) It calculates the detected coordinate position corresponds to which position in the field of view range image of user U1 obtained in S201. (4) Based on the position information in the calculated field of view range image, it calculates the selected object at position of the user U1's line of sight is which position in the display image of the information terminal 200.

FIGS. 12A, 12B, and 12C are diagrams that illustrating the display control of additional information in this example. In FIGS. 12A, 12B, and 12C, the left and right figures show the user's field of view through the HMD's transmissive display before and after additional information display control, respectively.

FIG. 12A shows a case in which there is additional information 1 and 2, and the user U1 gives a selection instruction while state of keeping his/her line of sight on the additional information 1. In other words, as a UI (User Interface) that enables selection of additional information or a UI that triggers selection of additional information, it displays a cross-shaped cursor at the position where the line of sight is focused, and performs to the selection instruction by detecting the touch sensor tap operation or blink operation described above, in state of keeping his/her line of sight on the additional information want to be selected and the cross-shaped cursor is displayed on. In FIG. 12A, only additional information 1 is displayed in a position that does not overlap with the information terminal visual recognition area in the transmissive display 131 by the additional information display control described in FIG. 11 and it is deleted from the information terminal 200, and additional information 2 is displayed as it is in the information terminal 200, i.e., it is displayed while being superimposed on the main image.

FIG. 12B differs from FIG. 12A in that it shows the case where user U1 gives a selection instruction with state of keeping his/her line of sight on additional information 2. In FIG. 12B, by the additional information display control described in FIG. 11, only the additional information 2 is displayed in a position that does not overlap with the information terminal visual recognition area in the transmissive display 131 and it is deleted from the information terminal 200, and the additional information 1 is displayed while being superimposed on the main image.

FIG. 12C shows the case of another display control in which there is additional information 1 and additional information 2, and the user U1 has given selection instructions while state of keeping his/her line of sight on the additional information 1. In FIG. 12C, by selecting one additional information, all additional information superimposed on the main image of the information terminal 200 is displayed in a position that does not overlap with the information terminal visual recognition area in the transmissive display 131 and it is deleted from the information terminal 200. In this way, selecting one additional information may be used as a trigger, all additional information may be displayed in a position that does not overlap with the information terminal visual recognition area.

Also, by the additional information display control, additional information that is displayed in a position that does not overlap with the information terminal visual recognition area in the transmissive display 131, may be displayed changing shape according to the shape of the transmissive display 131, and the position and/or size of the information terminal visual recognition area.

Also, even when there is only one additional information superimposed on the main image of the information terminal 200, as the selection instruction by user U1 is trigger, the additional information display control processing may begin.

According to this example, it provides an HMD that can control the display of additional information on the HMD's display, when the information terminal, in which additional information is superimposed on the main image and is displayed, is viewed through the HMD's display, it has a UI that enables selection of the additional information, and displays the selected additional information in a position that does not overlap with the main image of the information terminal on the HMD display.

Example 4

This example describes another example of the process of displaying additional information.

Figure 13A:
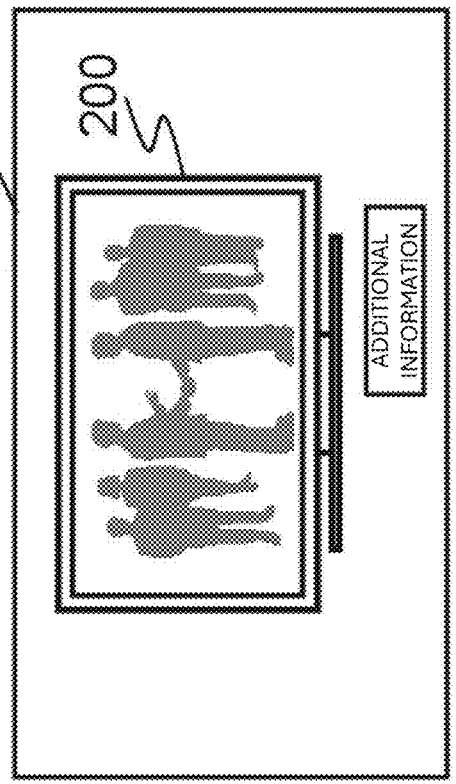
FIG. 13A is a diagram that illustrates the first process of controlling the display of additional information in Example 4.

FIGS. 13A, 13B, and 13C are diagrams that illustrating the display control of additional information in this example. In FIGS. 13A, 13B, and 13C, as in FIG. 12A, the left and right figures show the user's field of view through the transmissive display of the HMD before and after additional information display control, respectively.

FIG. 13A shows the first processing of additional information on the information terminal side after additional information display control. Thus, as shown in FIG. 13A, after additional information is displayed in a position that does not overlap with the information terminal visual recognition area in the transmissive display 131 by additional information display processing control, the information terminal 200 side may stop displaying the additional information.

FIG. 13B shows the second processing of additional information on information the terminal side after additional information display control. Thus, as shown in FIG. 13B, after additional information is displayed in a position that does not overlap with the information terminal visual recognition area in the transmissive display 131 by the additional information display processing control, in the information terminal 200 side, the additional information may be reduced to a size that does not interfere with the visibility of the main image and be displayed. Note that, in this case, a request for reduced display of additional information is sent instead of a request to stop displaying additional information in S106 of FIG. 5.

FIG. 13C shows the third processing of additional information on the information terminal side after additional information display control. Thus, as shown in FIG. 13C, after additional information is displayed in a position that does not overlap with the information terminal visual recognition area in the transmissive display 131 by the additional information display processing control, the information terminal 200 side, the additional information may be moved to a position where it does not interfere with the visibility of the main image and be displayed. In this case, a request to move the additional information is sent instead of a request to stop displaying the additional information in the S106 process in FIG. 5. Note that, the moving position of the additional information in the information terminal 200 may be a position where a part of the additional information protrudes from the display area of the information terminal 200, as shown in FIG. 13C.

According to this example, it provides an HMD that can control the display of additional information so that it does not interfere with the viewing of the main image in the information terminal, when the information terminal, in which additional information is superimposed on the main image and is displayed, is viewed through the HMD's display, it displays the additional information of information terminal in a position that does not overlap with the main image of the information terminal on the HMD display.

Example 5

This example describes an example in which additional information on the information terminal is obtained via the network and the display control of such additional information is performed.

Figure 14:
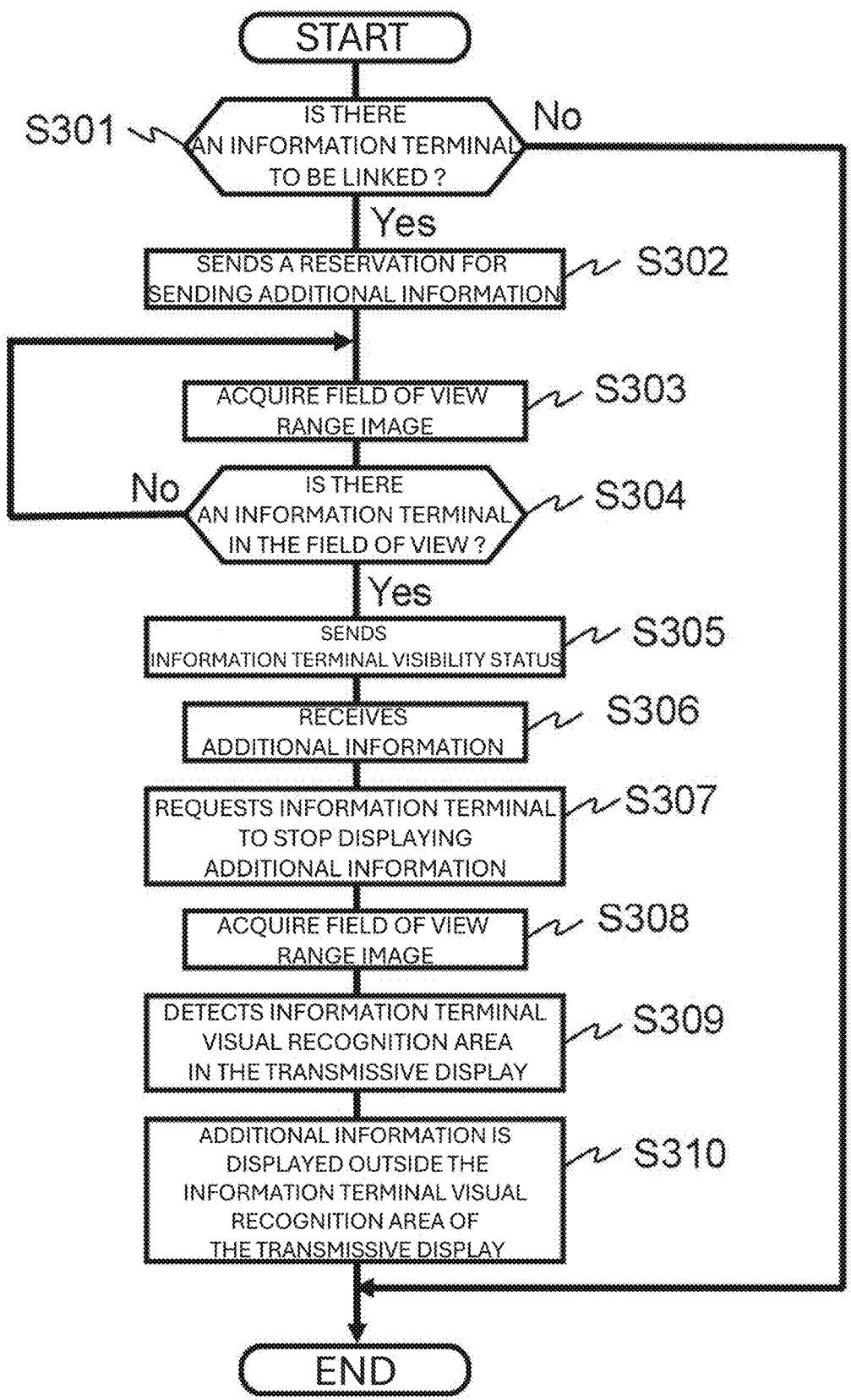
FIG. 14 is a flowchart of the HMD's additional information display control processing in Example 5.

FIG. 14 is a flowchart of the additional information display control processing of the HMD in this example. The flowchart shown in FIG. 14 is a variant of the additional information display control processing described in Example 1 and Example 3.

In FIG. 14, first, in step S301, the additional information presence/absence analysis part 1112 confirms whether there is an already linked information terminal 200 on the same network 300. If there is an already linked information terminal 200, the process proceeds to S302. If there is no already linked information terminal 200, the process ends.

Next, at S302, the additional information acquisition part 1113 sends a reservation additional information to the already linked information terminal 200. Note that, regardless of whether or not the additional information is displayed on the information terminal side, the reservation for sending additional information may be sent to the information terminal in advance. Then, in S303, image capturing part 1111 acquires the image (field of view range image) corresponding to the field of view range of user U1 from first image input part 133.

Next, in S304, additional information presence/absence analysis part 1112 analyzes the field of view range image of user U1 obtained in S303 and confirms whether the already linked information terminal 200 is included in the field of view range of user U1. Then, if the field of view range of user U1 includes the already linked information terminal 200, the process proceeds to S305. If the field of view range of user U1 does not include the already linked information terminal 200, the process returns to S303.

In S305, the additional information presence/absence analysis part 1112 sends effect of a status that the already linked information terminal 200 is included in the field of view range of user U1 (information terminal visibility status) to the already linked information terminal 200. Then, at S306, the additional information acquisition part 1113 receives the additional information sent by the already linked information terminal 200 in response to the information terminal visibility status sent in process of S305. Note that, if the displayed image of the already linked information terminal 200 does not have the additional information superimposed on the main image, the process may be finished by receiving information to that effect. That is, when the information terminal 200 receives effect of information terminal visibility status from the HMD 100, it transmits the additional information to the HMD 100 when the displayed image of the information terminal 200 has the additional information superimposed on the main image, it sends information to that effect to the HMD 100 when the displayed image of the information terminal 200 does not have the additional superimposed on the main image.

Next, at S307, additional information acquisition part 1113 sends a request to stop displaying additional information, already to the linked information terminal 200. Then, in S308, image capturing part 1111 acquires the image (field of view range image) corresponding to the field of view range of user U1 from first image input part 133. Note that, the field of view range image obtained in S303 may be used in subsequent processes without processing in S308.

Next, in S309, the display controller 1114 analyzes the field of view range image of user U1 obtained in the process of S308, detects the area (information terminal visual recognition area) in which the already linked information terminal 200 is visual recognized in the transmissive display 131. Then, in S310, the display controller 1114 displays additional information received from the already linked information terminal 200 in the process of S306, at a predetermined position on the transmissive display 131 that does not overlap with the information terminal visual recognition area detected in the S309 process.

FIGS. 15a, 15b, and 15c are diagrams that illustrating the display control of additional information in this example. FIG. 15A is a diagram that illustrates the first state, in this case user U1 is facing left to the information terminal 200 and the entirety of the information terminal 200 does not fit in the field of view range U1S of user U1, shows state that entirety of the information terminal 200 does not fit in the transmissive display 131. And, the already linked information terminal 200 in not fit in the field of view range of user U1 in the process of S304 in FIG. 14, the information terminal visibility status is not sent to the linked information terminal 200, and it is state of additional information is not received from the already linked information terminal 200. Note that, not shown in the figure, the displayed image of the information terminal 200 is state of additional information superimposed on the main image.

FIG. 15B is a diagram that illustrates the second state, and shows the first state in which user U1 turns his/her head to the right from the state in FIG. 15A and the entire information terminal 200 enters the field of view range U1S of user U1. In this case, the state is immediately after detecting the already linked information terminal 200 into the field of view range of user U1 in the process of S304 in FIG. 14, and no additional information has been received from the already linked information terminal 200 yet. Note that, the displayed image of the information terminal 200 is still in the state where additional information is superimposed on the main image.

FIG. 15C is a diagram that illustrates the third state, and shows the state in which S305 and subsequent processes in FIG. 14 are performed from the state in FIG. 15B. In other words, FIG. 15C shows that the information terminal visibility status is sent to the already linked information terminal 200 in the S305 process of FIG. 14, receiving additional information from the already linked information terminal 200 in the S306 process, and state of displaying additional information received from the already linked information terminal 200 in the S310 process, at a predetermined position on the transmissive display 131 that does not overlap with the information terminal visual recognition area detected in the processing of S309.

As described above, this example provides an HMD that can control the display of additional information on the HMD display, when the information terminal, in which additional information is superimposed on the main image and is displayed, is viewed through the HMD's display, it acquires to the additional information of the information terminal via the network, and displays the additional information in a position that does not overlap with the main image of the information terminal on the HMD's display.

Note that, in the above explanation, the state in which the entire information terminal 200 is not fit in the field of view range U1S of user U1 is determined to be the state in which the already linked information terminal 200 is not included in the field of view range of user U1 by the processing of S304 in FIG. 14, and the state in which the entire information terminal 200 is fit in the field of view range U1S of user U1 is determined to be the state in which the already linked information terminal 200 is included in the field of view range of user U1 by the processing of S304 in FIG. 14. However, it may be that the state in which even a part of the information terminal 200 is not included in the field of view range U1S of user U1 is determined to be the state in which the already linked information terminal 200 is not included in the field of view range of user U1 by the processing of S304 in FIG. 14, and the state in which even a part of the information terminal 200 is included in the field of view range U1S of user U1 is determined to be the state in which the already linked information terminal 200 is included in the field of view range of user U1 by the processing of S304 in FIG. 14.

Example 6

This example describes another example of display control of additional information in Example 5.

FIG. 16 is a flowchart of the additional information display control processing of HMD in this example. FIG. 16 may be implemented in parallel with FIG. 14 in Example 5, or independently.

In FIG. 16, first, in step S321, similar to S303 in FIG. 14, image capturing part 111 obtains image (field of view range image) corresponding to the field of view range of user U1 from first image input part 133.

Next, at S322, the additional information presence/absence analysis part 1112 analyzes the field of view range image of user U1 obtained in the process of S321, and confirms whether there is an information terminal 200 already linked on the network within the field of view range of user U1. Then, if an already linked information terminal 200 is included in the field of view range of user U1, it returns to the process in S321. If there is no already linked information terminal 200 in the field of view range of user U1, it proceeds to the process in S323.

In S323, the additional information acquisition part 1113 requests the transmission of the main image to the already linked information terminal 200. Note that, at the same time, a request for redisplay of additional information may also be sent. Next, at S324, additional information acquisition part 1113 receives the main image from the already linked information terminal 200. Then, at S325, the display controller 1114 displays the main image received from the already linked information terminal 200 in the process of S324 at a predetermined position on the transmissive display 131.

FIGS. 17A, 17B, and 17C are diagrams that illustrating the display control of additional information in this example. FIG. 17A, is the same as FIG. 15C, is a diagram that illustrates the first state in this example, shows the state the entire information terminal 200 is in the field of view range U1S of user U1. In this case, it shows the state in which additional information is displayed at a predetermined position that does not overlap with the information terminal visual recognition area of the transmissive display 131.

FIG. 17B is a diagram that illustrates the second state, shows the state in which user U1 turns his/her head to the left from the state in FIG. 17A, and the position of information terminal 200 in the transmissive display 131 moves relatively to the right. In other words, in the process S322, it detects that the information terminal 200 is partially missing from the field of view range U1S of user U1, but the state is shown that the additional information is fixed and displayed at the specified position of the transmissive display 131.

FIG. 17C is a diagram that illustrates the third state, shows the state in which user U1 turns his/her head further to the left from the state shown in FIG. 17B, and the information terminal 200 is no longer included in the field of view range U1S of user U1. In other words, in the process of S322, it is detected that the information terminal 200 is out of the field of view range U1S of user U1, and it is shown that state that displaying the main image of the information terminal 200 received in the process of S324 in the transmissive display 131, instead of the information terminal 200 that was being viewed through the transmissive display 131.

Thus, in this example, even if the position of the information terminal moves relatively in the field of view range, the additional information is fixed and displayed at a predetermined position on the transmissive display. Also, even if the information terminal is no longer included in the field of view range, the main image of the information terminal can be displayed on the transmissive display.

Example 7

This example describes another example of display control of additional information.

FIG. 18 is an explanatory diagram of the additional information display control processing of HMD in this Example. FIG. 18 is the field of view of user U1 through the transmissive display 131, the upper diagram shows state of viewing the information terminal 200 with additional information displayed via the transmissive display 131. The lower diagram of FIG. 18 shows state in which additional information is displayed on the transmissive display 131 by the additional information display control.

In addition to being superimposed on the main image, the addition information may be displayed for example an L-shape like data broadcasting, in an area vacated by reducing the size of the main image, as shown in the upper figure in FIG. 18.

In the case of the display shape of additional information as shown in the figure above, in this example, by the additional information display control, it requests the information terminal 200 to transmit the additional information and at the same time requests the main image to be enlarged display, as shown the lower diagram of FIG. 18, it performs to enlarge the main image and displays additional information in a position that does not overlap with the information terminal visual recognition area on the transmissive display 131.

As described above, this example provides an HMD has display control of additional information, which enables the additional information of the information terminal to be displayed in a position that does not overlap with the main image of the information terminal on the HMD display, when the information terminal, in which additional information is superimposed on the main image and is displayed, is viewed through the HMD's display, even if the additional information is superimposed in an L-shape.

Example 8

This example describes another example of display control of additional information.

FIG. 19 is an explanatory diagram of the additional information display control processing of the HMD in this example. Note that, in this example, it is assumed that the distance between the user U1 and the information terminal 200 is close and state in which the information terminal 200 occupies most of the field of view of the user U1 through the transmissive display 131. That is, the information terminal visual recognition area 131R occupies most of the transmissive display 131, and it is an example of additional information display control processing when it is difficult to display additional information in a position that does not overlap with the information terminal visual recognition area 131R in the display area of the transmissive display 131, in the additional information display control processing of the HMD.

The upper diagram in FIG. 19 is state of viewing information terminal 200 with additional information displayed via transmissive display 131, shows state of before additional information display control processing is performed. The information terminal 200 is superimposed additional information 200s on the main image 200m and is displayed. Also, as mentioned above, the information terminal 200 occupies most of the field of view of user U1 through the transmissive display 131.

The lower diagram in FIG. 19 is state of additional information displayed on transmissive display 131 by additional information display control processing, shows state of after additional information display control processing is performed. As mentioned above, when the information terminal 200 occupies most of the user U1's field of view through the transmissive display 131, before displaying the additional information 131s on the transmissive display 131, it is caused the information terminal 200 is to transmit a main image reduced display request. The information terminal 200 reduces the size of the main image 200m and displays the no image 200b (monochromatic fixed image) in the vacant portion in response to the aforementioned main image reduction display request.

By performing such control, a part of the area of the additional information 131s overlaps with the image portion of the information terminal 200, but since the overlapping area is no image 200b (monochromatic fixed image), the visibility of the additional information 131s is not impaired.

As described above, according to this example, it is possible to provide an HMD having display control of additional information that can be display without losing the ease of viewing the additional information, when the information terminal, in which additional information is superimposed on the main image and is displayed, is viewed through the HMD's display, even when the additional information can only be displayed in a position that overlaps with the information terminal.

Although the above examples have been described, the present invention is not limited to the above examples, but includes various variations. For example, the viewing target may be a PC screen, etc. in addition to TVs and smartphones, and the additional information may be subtitles, sub-screens, or other superimposed data. All of these are within the scope of the invention. In addition, the numerical values, messages, etc. that appear in the text and figures are only examples, and if the use of different ones, it does not impair the effect of the invention.

Also, the functions, etc. of the invention described above may be realized in hardware by, for example, designing some or all of them in an integrated circuitry. By a microprocessor unit, CPU, or the like interpret and execute an operating program that realizes the respective functions, etc., it may also be implemented in software. Also, the scope of software implementation is not limited, and hardware and software may be used together. In addition, part or all of each function may be realized by a server. Note that, the server does not matter the form, it may be a local server, a cloud server, an edge server, a network service, etc., as long as it is capable of executing functions in cooperation with other configuration part via communication. Information such as programs, tables, and files that realize each function may be stored in Storage device such as memory, hard disks, SSD (Solid State Drive), recoding media such as IC cards, SD cards, and DVDs, or the devices on the communication network.

Also, the programs described in each processing example may be independent programs, or multiple programs may constitute a single application program. In addition, the order in which each process is performed may be interchanged and executed.

Also, the control and information lines shown in the figure are indicated, those considered necessary for illustrative purposes, and it does not necessarily indicate all the control and information lines on the product. In reality, it may be considered that almost all of the configurations are interconnected.

Also, the above examples are described in detail for the purpose of explaining the invention in an easy-to-understand manner, and are not necessarily limited to those having all the described configurations. It is also possible to replace part of the configuration of one example with the configuration of another example, and it is also possible to add the configuration of another example to the configuration of one example. It is also possible to add another configuration, delete, or replace, regarding a part of the configuration of each example.

REFERENCE SIGNS LIST

100: HMD (head mounted display apparatus), 101: main controller, 103: RAM, 110: storage, 120: operation input part, 130: image processor, 131: transmissive display, 131R: information terminal visual recognition area, 140: audio processor, 151: location information acquisition part, 160: sensor part, 170: communication part, 180: expansion interface part, 200: information terminal, 300: network, 310: server apparatus, 1001: basic operation program, 1002: application, 1009: various data storage area, 1101: basic operation function part, 1111: image capturing part, 1112: additional information presence/absence analysis part, 1113: additional information acquisition part, 1114: display controller, 1199: temporary memory area, U1: user, U1S: field of view range

The invention claimed is:

1. A head mounted display apparatus includes a transmissive display, comprising:
    an image capturing part acquires field of view range image, which is an image corresponding to the field of view range of user,
    an additional information presence/absence analysis part analyzes the acquired field of view range image, confirms whether an information terminal included in the field of view range of user, and confirms whether a display image of an information terminal included in the field of view range of user is the one in which additional information is superimposed on the main image,
    an additional information acquisition part requests the information terminal or contents server to send additional information, and receives the additional information,
    a display controller detects an information terminal visual recognition area that is an area where the information terminal is viewed in the transmissive display, and displays the received additional information in a position that does not overlap with the information terminal visual recognition area of the transmissive display.

2. The head mounted display apparatus according to claim 1, wherein,
    the additional information acquisition part sends a display stop request of the additional information to the information terminal.

3. The head mounted display apparatus according to claim 1, wherein,
    the additional information presence/absence analysis part sends the confirmation request whether the display image of the information terminal is the one in which additional information is superimposed on the main image, to the information terminal, and confirms whether a display image of the information terminal is the one in which additional information is superimposed on the main image, based on the reply from the information terminal.

4. The head mounted display apparatus according to claim 1, wherein,
    the additional information presence/absence analysis part extracts the display image part of the information terminal from the field of view range image of the user, performs search process on the network based on the extracted display image, obtains information about contents server that provides the main image to the information terminal, sends the display image part of the information terminal to the contents server, receives information from the content server regarding a main image supplied by the content server to the information terminal, and confirms whether a display image of the information terminal is the one in which additional information is superimposed on the main image, based on the image of the display image part of the information terminal and the information about the main image that the contents server supplies to the information terminal.

5. The head mounted display apparatus according to claim 1, wherein,
    the display controller displays the additional information while fixing the display position thereof even if the state that the position of the information terminal in the transmissive display moves relatively.

6. The head mounted display apparatus according to claim 1, wherein,
    the display controller displays the additional information in a fixed position relative to the information terminal, when the position of the information terminal in the transmissive display moves relatively.

7. The head mounted display apparatus according to claim 1, wherein,
    the additional information presence/absence analysis part, based on the acquired field of view range image, accepts the user's selection instruction for any object on the display image of the information terminal, confirms the position of the selected selection object in the display image of the information terminal, and confirms whether the selection object is additional information superimposed on the main image.

8. The head mounted display apparatus according to claim 7, wherein,
the user's selection instruction performs by detecting the touch sensor tap operation or blink operation, in state of keeping his/her line of sight on the object want to be selected.

9. The head mounted display apparatus according to claim 7, wherein,
the display controller displays all additional information in a position that does not overlap with the information terminal visual recognition area, selecting one additional information by the user's selection instruction as a trigger.

10. The head mounted display apparatus according to claim 1, wherein,
the additional information acquisition part sends a request for reduced display of additional information to the information terminal.

11. The head mounted display apparatus according to claim 1, wherein,
the additional information presence/absence analysis part sends a request to move of the additional information to the information terminal.

12. The head mounted display apparatus according to claim 1, wherein,
the additional information presence/absence analysis part confirms whether there is an already linked information terminal on the network, when there is an already linked information terminal, the additional information acquisition part sends a reservation for sending additional information to the already linked information terminal, the additional information presence/absence analysis part sends effect of a status that the already linked information terminal is included in the field of view range of user to the already linked information terminal, and the additional information acquisition part receives the additional information sent by the already linked information terminal via the network.

13. The head mounted display apparatus according to claim 1, wherein,
the additional information presence/absence analysis part confirms whether there is an already linked information terminal on the network, analyzes the field of view range image of user, and confirms whether the already linked information terminal is included in the field of view range of user,
the additional information acquisition part requests the transmission of the main image to the already linked information terminal and receives the main image, and
the display controller displays the main image received from the already linked information terminal at a predetermined position on the transmissive display.

14. The head mounted display apparatus according to claim 1, wherein,
the display image of the information terminal included in the field of view range of user is the one has additional information displayed in an L-shape in an vacated area by reducing the main image,
the additional information presence/absence analysis part confirms whether the display image of the information terminal included in the field of view range of user, is the one has the L-shape additional information,
the additional information acquisition part requests transmit the additional information and at the same time requests the main image to be enlarged display,
the display controller displays the additional information in a position that does not overlap with the information terminal visual recognition area on the transmissive display.

15. A head mounted display apparatus includes a transmissive display, comprising:
a first image,
a communication part, and
a controller, wherein,
the controller
acquires field of view range image, which is an image corresponding to the field of view range of user, analyzes the acquired field of view range image, confirms whether an information terminal included in the field of view range of user, confirms whether a display image of an information terminal included in the field of view range of user is the one in which additional information is superimposed on the main image,
requests the information terminal or contents server to send additional information via the communication part, and receives the additional information,
detects an information terminal visual recognition area that is an area where the information terminal is viewed in the transmissive display, and displays the received additional information in a position that does not overlap with the information terminal visual recognition area of the transmissive display.

* * * * *